US010838110B2

(12) United States Patent
Glik et al.

(10) Patent No.: US 10,838,110 B2
(45) Date of Patent: Nov. 17, 2020

(54) METASURFACE OPTICAL COUPLING ELEMENTS FOR A DISPLAY WAVEGUIDE

(71) Applicant: Microsoft Technology Licensing, LLC, Redmond, WA (US)

(72) Inventors: Eliezer Glik, Seattle, WA (US); Hagar Edelstain, Seattle, WA (US); Bernard C. Kress, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 607 days.

(21) Appl. No.: 15/449,869

(22) Filed: Mar. 3, 2017

(65) Prior Publication Data
US 2018/0252857 A1 Sep. 6, 2018

(51) Int. Cl.
*G02B 1/00* (2006.01)
*G02B 27/01* (2006.01)
*G02B 6/00* (2006.01)

(52) U.S. Cl.
CPC .............. *G02B 1/002* (2013.01); *G02B 6/00* (2013.01); *G02B 27/0172* (2013.01); *G02B 2027/0112* (2013.01); *G02B 2027/0125* (2013.01)

(58) Field of Classification Search
CPC ........ G02B 27/0172; G02B 2027/0178; G02B 27/0101; G02B 27/0176; G02B 2027/0125; G02B 2027/015; G02B 2027/0123; G02B 2027/0118; G02B 5/30; G02B 6/00; G02B 27/283; G02B 27/017; G02B 2027/0132; G02B 27/0149; G02B 2027/011;
(Continued)

(56) References Cited

U.S. PATENT DOCUMENTS 5,363,226 A 11/1994 Strasser et al.
5,420,947 A * 5/1995 Li ........................... G02B 6/34
359/569
(Continued)

FOREIGN PATENT DOCUMENTS

JP 2007253544 A 10/2007
WO 2016113533 A2 7/2016
WO 2016140720 A2 9/2016

OTHER PUBLICATIONS

Khorasaninejad et al., "Metalenses at visible wavelengths: Diffraction-limited focusing and subwavelength resolution imaging", sciencemag.org, vol. 352, Issue 6290, Jun. 3, 2016, pp. 1190-1194.
(Continued)

*Primary Examiner* — William R Alexander
*Assistant Examiner* — Sharrief I Broome
(74) *Attorney, Agent, or Firm* — Alleman Hall Creasman & Tuttle LLP

(57) ABSTRACT

Embodiments are disclosed for an optical waveguide display configured for use with a near-eye display (NED) device. In an embodiment the waveguide display includes a light-transmissive substrate and an optical coupling element configured to input light rays to the substrate or output light rays from the substrate, the optical coupling element configured to deflect a plurality of wavelengths of an incident light ray collinearly for propagation within the light-transmissive substrate through total internal reflection (TIR). The optical coupling element can include a pattern of nano-structures that collectively form a metasurface on the substrate.

18 Claims, 20 Drawing Sheets

(58) Field of Classification Search
CPC .......... G02B 2027/0134; G02B 27/145; G02B 27/0081; G02B 2027/0138; G02B 6/0056; H04N 13/344; H04N 13/332; H04N 13/363; H04N 13/383; H04N 5/74; H04N 13/117; H04N 13/239; H04N 13/286; H04N 13/341; H04N 13/361; H04N 13/366; H04N 2013/0085; H04N 5/21; H04N 5/225; H04N 5/64; H04N 9/3129; H04N 9/3147; H04N 13/00; H04N 13/144; H04N 13/32
See application file for complete search history.

(56) References Cited

U.S. PATENT DOCUMENTS

| | | | |
|---|---|---|---|
| 8,040,606 B2 | 10/2011 | Taira et al. | |
| 8,611,014 B2 | 12/2013 | Valera et al. | |
| 8,773,599 B2 | 7/2014 | Saeedi et al. | |
| 9,097,890 B2 | 8/2015 | Miller et al. | |
| 9,250,388 B1 | 2/2016 | Krishnamurthi et al. | |
| 9,372,347 B1 | 6/2016 | Levola et al. | |
| 9,423,360 B1 | 8/2016 | Kostamo et al. | |
| 9,507,150 B1 | 11/2016 | Stratton et al. | |
| 2008/0151379 A1 | 6/2008 | Amitai | |
| 2015/0125109 A1 | 5/2015 | Robbins et al. | |
| 2016/0025914 A1* | 1/2016 | Brongersma | G02B 1/002 359/489.07 |
| 2016/0259175 A1* | 9/2016 | Ellenbogen | G02B 27/4211 |
| 2016/0299337 A1* | 10/2016 | Arbabi | G02B 5/0263 |
| 2016/0320531 A1* | 11/2016 | Kamali | G02B 5/0226 |
| 2017/0045666 A1* | 2/2017 | Vasylyev | G02B 6/0028 |

OTHER PUBLICATIONS

Marciante, et al., "High-efficiency, high-dispersion diffraction gratings based on total internal reflection", In Journal of Optics Letters, vol. 29, Issue 6, Mar. 15, 2004, pp. 542-544.

"International Search Report and Written Opinion Issued in PCT Application No. PCT/US18/019802", dated Jul. 19, 2018, 11 Pages.

\* cited by examiner

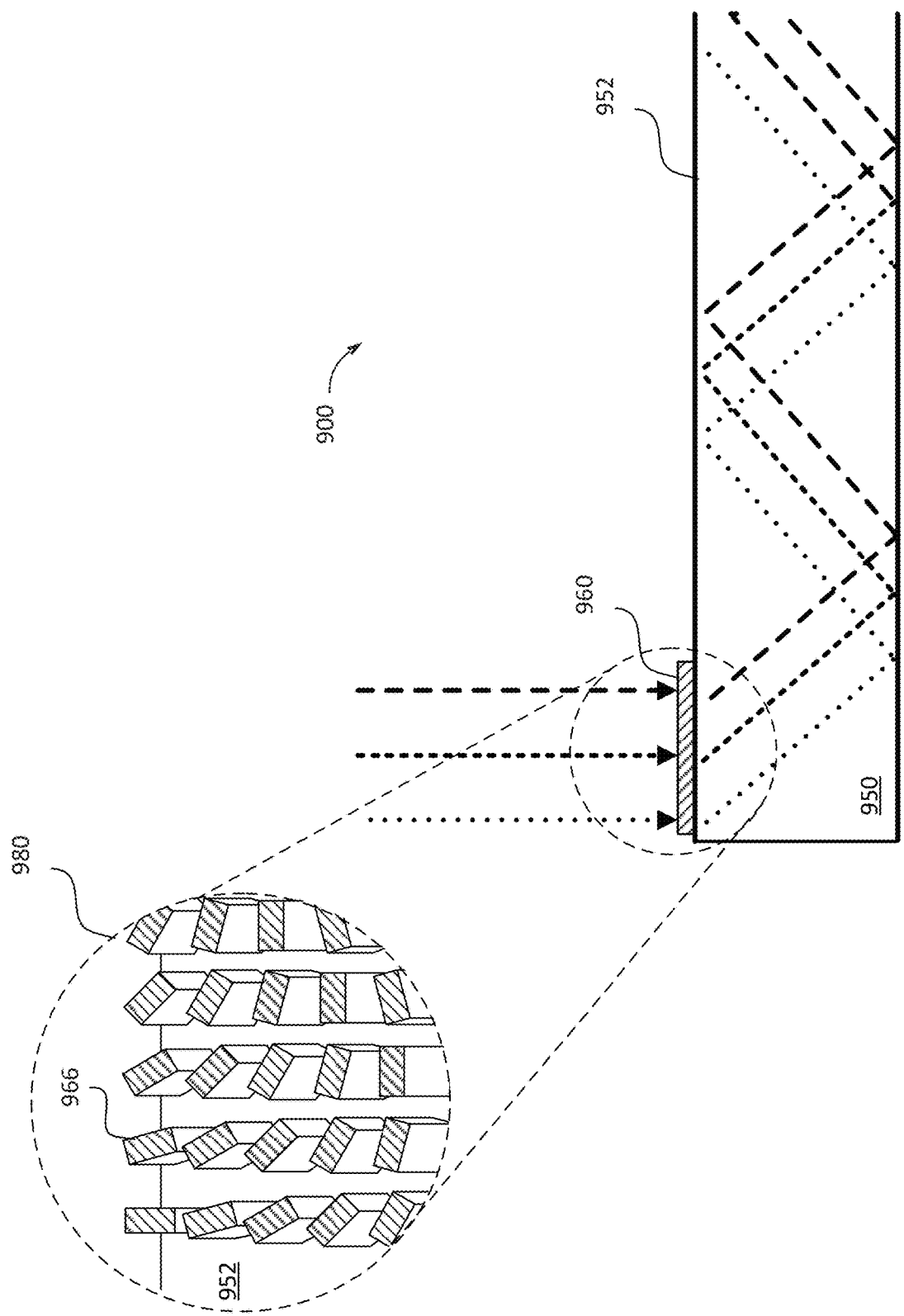

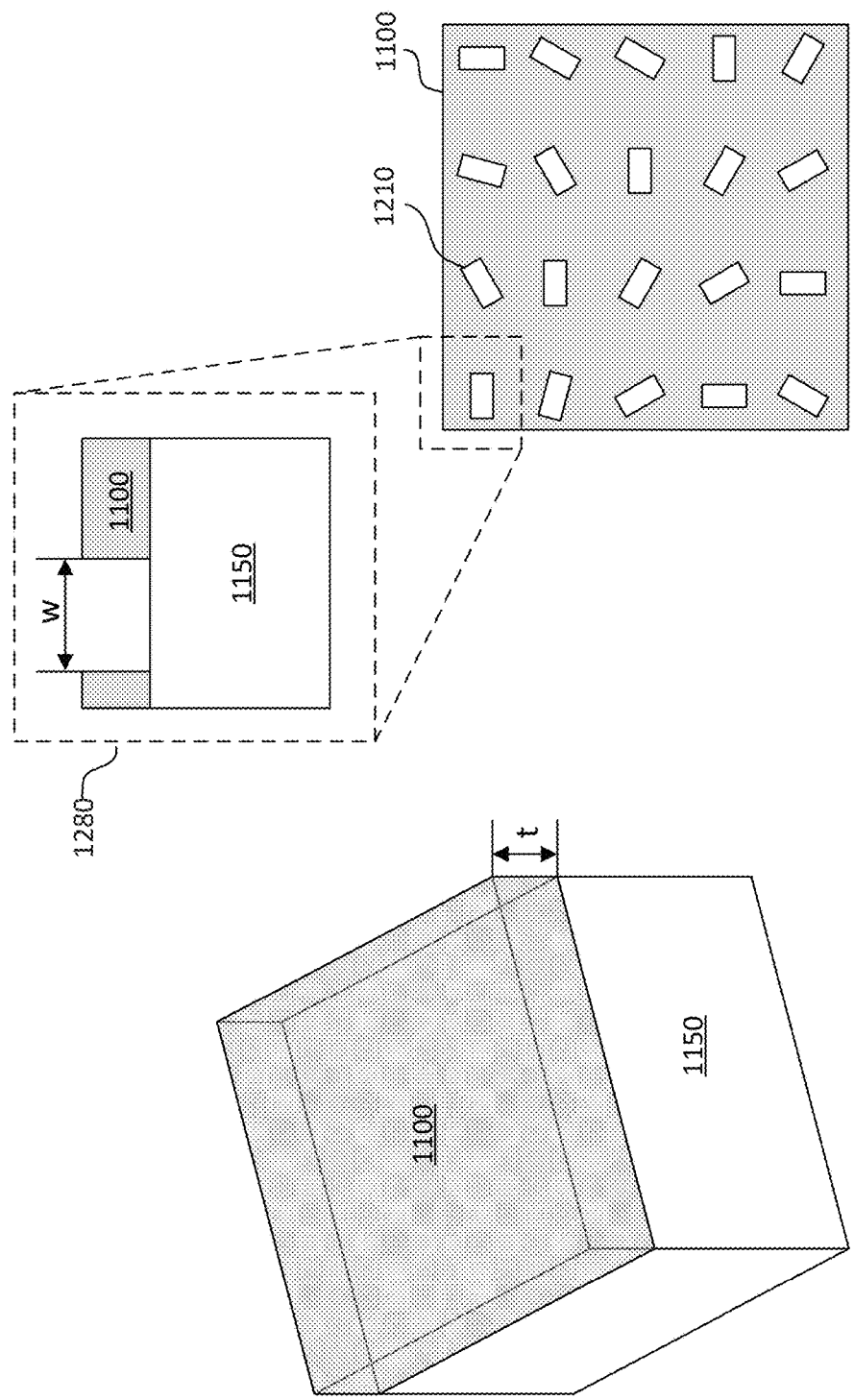

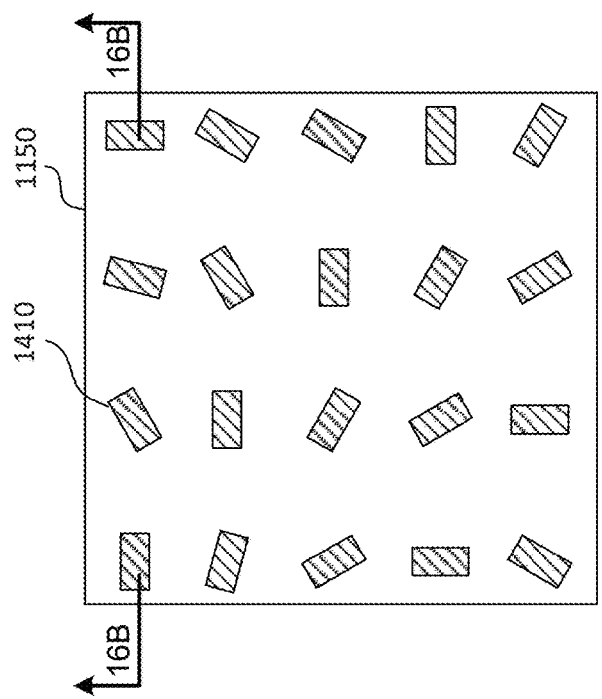
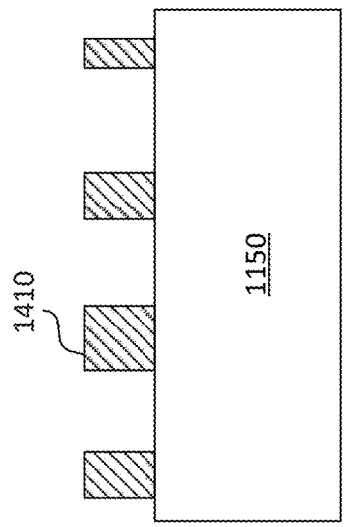
FIG. 16A
FIG. 16B
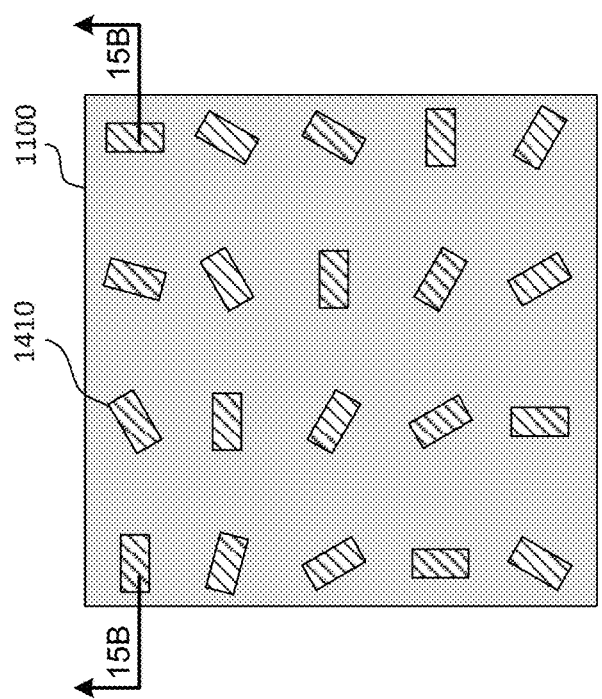
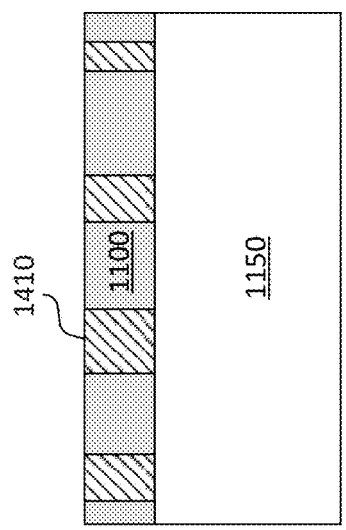
FIG. 15A
FIG. 15B

METASURFACE OPTICAL COUPLING ELEMENTS FOR A DISPLAY WAVEGUIDE

BACKGROUND

Display technology is advancing in the areas of augmented reality (AR) and virtual reality (VR) to provide users with more immersive visual experiences. For example, in some AR applications, generated imagery is displayed to a user via a transparent display that also allows the user to view the surrounding physical environment. The generated imagery enhances or augments the user's experience or knowledge of the surrounding physical environment.

In some implementations an optical waveguide can be used to spatially translate a generated image from one position to another position in an optical system. For example, in a near-eye display (NED) device, an optical waveguide can spatially translate propagating light rays representing imagery generated by a microdisplay and convey them along an optical path toward one or both eyes of a user. Such technology may be incorporated into an NED device in the form of eyeglasses, goggles, a helmet, a visor, or some other type of head-mounted display (HMD) device or eyewear.

SUMMARY

The technique introduced here includes an optical waveguide, a method of manufacturing such an optical waveguide, and an NED device incorporating such a waveguide. In various embodiments the optical waveguide can include a light-transmissive substrate that includes multiple internally reflective surfaces. The optical waveguide can further include an optical coupling element formed on or proximate to one of the surfaces of the substrate. In general, the optical coupling element is configured to input light rays to the substrate or output light rays from the substrate. According to the techniques introduced herein, the optical coupling element can be configured to deflect a plurality of wavelengths of an incident light ray collinearly for propagation within the light-transmissive substrate by total internal reflection (TIR). To accomplish this, the optical coupling element can include a pattern of nano-structures that collectively form a metasurface on the substrate.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 9B shows a detail of the waveguide of FIG. 9A.

FIG. 11 shows an isometric view of a portion of a substrate with a layer of resist material following a first step of an example process for fabricating a metasurface.

FIG. 12 shows a top view of the portion of substrate of FIG. 11 with a pattern of the resist material removed following a second step of the example process for fabricating a metasurface.

FIG. 15A shows a top view of the portion of substrate of FIG. 11 with the excess dielectric material removed following a fourth step of the example process for fabricating a metasurface.

FIG. 15B shows a cross-sectional view corresponding to the top view of FIG. 15A.

FIG. 16A shows a top view of the portion of substrate of FIG. 11 with the resist material removed following a fifth step of the example process for fabricating a metasurface.

FIG. 16B shows a cross-sectional view corresponding to the top view of FIG. 16A.

DETAILED DESCRIPTION

Figure 1:
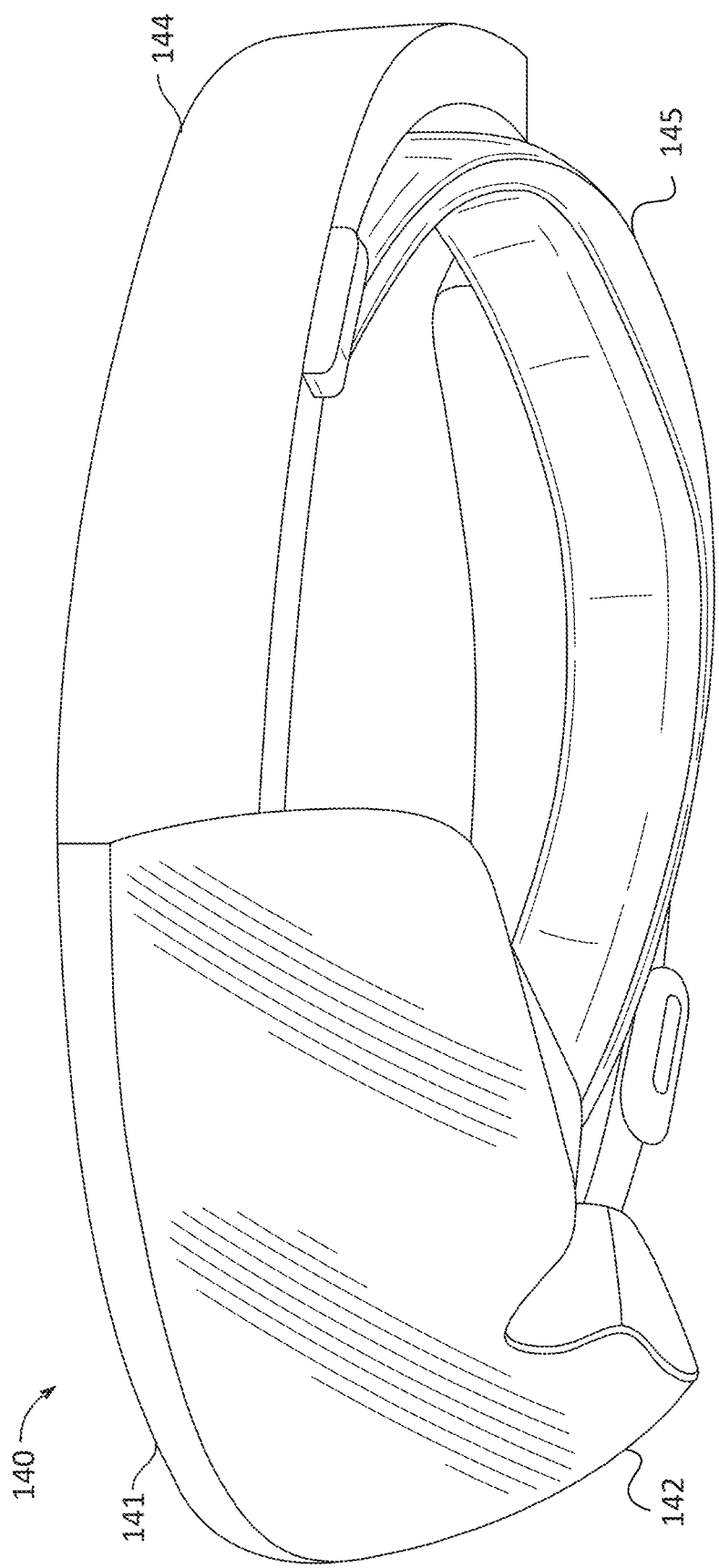
FIG. 1 shows an example of a near-eye display (NED) device in which the technique introduced here can be incorporated.

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device according to the embodiments disclosed herein can potentially be used by a user that is not human, such as a machine or an animal. Hence, the term "user" can refer to any of those possibilities, except as may be otherwise stated or evident from the context. Further, except where stated otherwise, the term "eye" is used herein as a general term to refer to an optical receptor of any type of user of a display device, and therefore can refer to a human eye, an animal eye, or a machine-implemented optical sensor designed to detect an image in a manner analogous to a human eye.

Some NED devices, such as HMD devices, include optical systems for spatially translating a pupil from one position to another position, for example from a microdisplay imager to an eye of a user. This optical system is sometimes referred to as a pupil relay system. An NED device can include one or more transparent waveguides arranged so that they are located directly in front of each eye of the user when the NED device is worn by the user, to project light representing generated images into the eye of the user. With such a configuration, images generated by the NED device can be overlaid on the user's view of the surrounding physical environment. Waveguides configured for use in NED devices include reflective surfaces configured to propagate light rays by total internal reflection (TIR). One aspect of translating a pupil from one position to another via a waveguide involves receiving the light rays into the waveguide ("in-coupling") at a first location and outputting the light rays from the waveguide ("out-coupling") at a second location.

Light rays can be in-coupled to and out-coupled from a waveguide via an optical element that functions as an optical input port or an optical output port for the light rays. For example in some implementations an optical element configured to in-couple and/or out-couple light rays can comprise a grating structure such as a surface relief grating (SRG).

The angle of deflection of light rays resulting from diffraction by an SRG will depend on the wavelength of the incident light rays. In other words, polychromatic light rays interacting with an SRG at a particular angle of incidence will tend to deflect at different angles thereby separating the light into constituent colors. This phenomenon is referred to as dispersion. In the context of an optical waveguide for an NED device, dispersion caused by the optical coupling elements can lead to poor image translation (e.g. lack of focus, rainbow effect, narrow field of view (FOV), etc.).

One possible solution to this problem involves use of multiple waveguides, each designed specifically to translate light of a particular component color. For example, to convey color images from an image to an eye of a user, an NED device may include three layered waveguides, one to convey light in the red spectrum, one to convey light in the green spectrum, and one to convey light in the blue spectrum. While effective to an extent, such a solution adds weight, bulk, and complexity to the device. This can be particularly detrimental in the context of an NED device, where light weight, small size and simplicity are important usability criteria.

Accordingly, introduced herein is a waveguide-based display device that solves this problem by implementing achromatic optical coupling elements for a waveguide, configured to in-couple or out-couple multiple colors of light. In some embodiments, the optical coupling elements include patters of nanometer-scale structures (i.e., nano-structures, collectively referred to as a metasurface) formed on or proximate to a surface of a substrate and arranges so as to deflect a plurality of wavelengths of an incident light ray collinearly for propagation within the light-transmissive substrate through total internal reflection (TIR)

FIG. 1 shows an example of a near-eye display (NED) device in which the technique introduced here can be incorporated. The NED device 140 may provide virtual reality (VR) and/or augmented reality (AR) display modes for a user, i.e., the wearer of the device. To facilitate description, it is henceforth assumed that the NED device 140 is an HMD device designed for AR visualization.

In the illustrated embodiment, the NED device 140 includes a chassis 141, a transparent protective visor 142 mounted to the chassis 141, and left and right side arms 144 mounted to the chassis 141. The visor 142 forms a protective enclosure for various display elements (not shown) that are discussed below.

The chassis 141 is the mounting structure for the visor 142 and side arms 144, as well as for various sensors and other components (not shown) that are not germane to this description. A display assembly (not shown in FIG. 1) that can generate images for AR visualization is also mounted to the chassis 141 and enclosed within the protective visor 142. The visor assembly 142 and/or chassis 141 may also house electronics (not shown) to control the functionality of the display assembly and other functions of the NED device 40. The NED device 140 shown in FIG. 1 is a head-mounted display HMD device and so further includes an adjustable headband 145 attached to the chassis 141, by which the NED device 140 can be worn on a user's head.

Figure 2A:
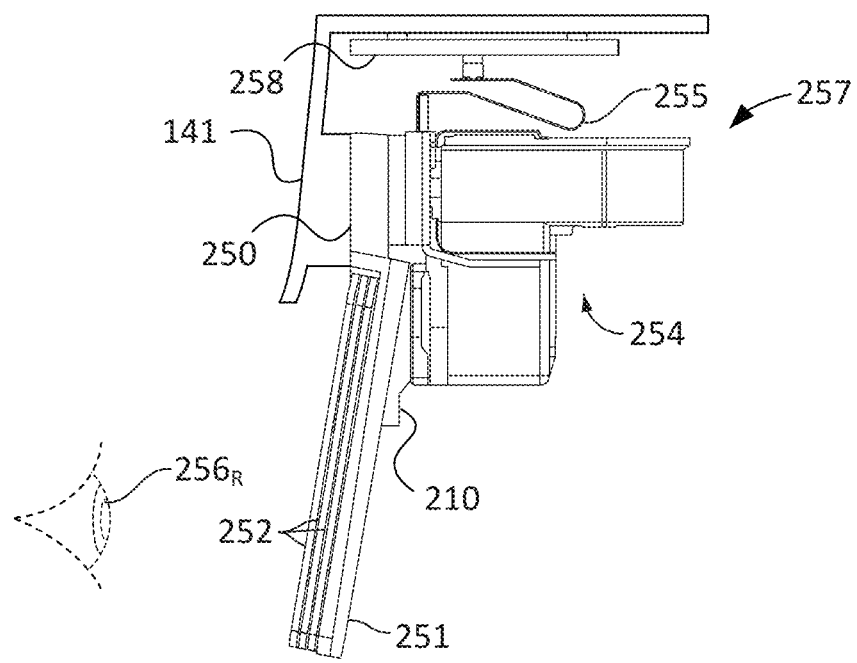
FIG. 2A shows a right side view of display components that may be contained within the NED device of FIG. 1.
Figure 2B:
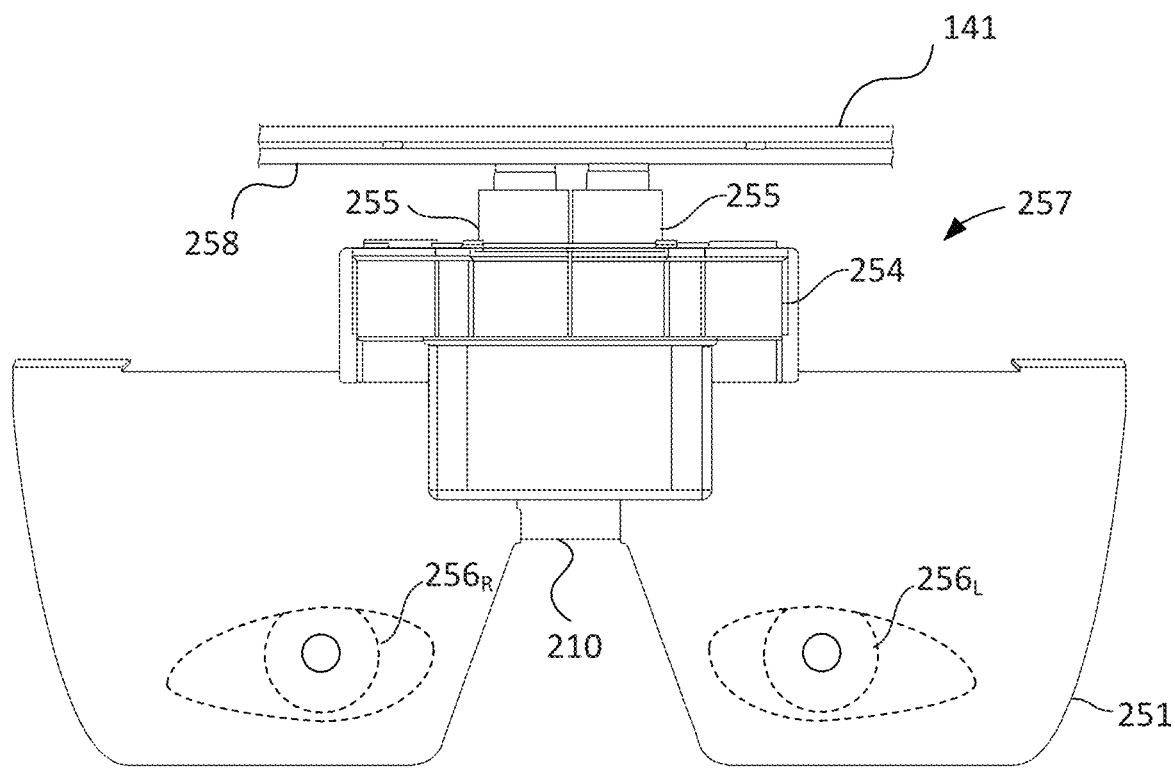
FIG. 2B shows a front view of display components that may be contained within the NED device of FIG. 1.

FIGS. 2A and 2B show, in accordance with certain embodiments, right side and front orthogonal views, respectively, of display components that may be contained within the visor 142 of the NED device 140. During operation of the NED device 140, the display components are positioned relative to the user's left eye 256$_L$ and right eye 256$_R$ as shown. The display components are mounted to an interior surface of the chassis 141. The chassis 141 is shown in cross-section in FIG. 2A.

The display components are designed to overlay three-dimensional images on the user's view of his real-world environment, e.g., by projecting light into the user's eyes. Accordingly, the display components include a display module 254 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 254 may be connected via a flexible circuit connector 255 to a printed circuit board 258 that has image generation/control electronics (not shown) mounted on it.

The display components further include a transparent waveguide carrier 251 to which the display module 254 is mounted, and one or more transparent waveguides 252 stacked on the user's side of the waveguide carrier 251, for each of the left eye and right eye of the user. The waveguide carrier 251 has a central nose bridge portion 210, from which its left and right waveguide mounting surfaces extend. One or more waveguides 252 are stacked on each of the left and right waveguide mounting surfaces of the waveguide carrier 251, to project light emitted from the display module and representing images into the left eye 256$_L$ and right eye 256$_R$, respectively, of the user. The display assembly 257 can be mounted to the chassis 141 through a center tab 250 located at the top of the waveguide carrier 251 over the central nose bridge section 210.

Figure 3A:
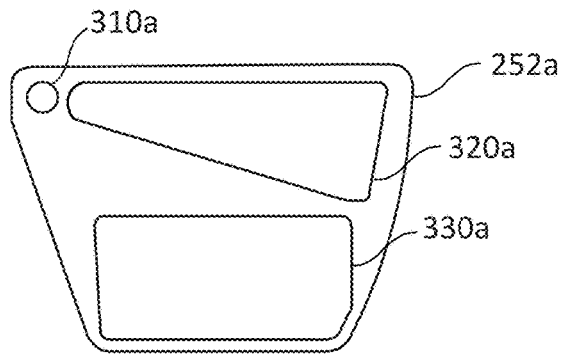
FIG. 3A shows an example waveguide with a single optical input port and a single optical output port configured to convey light to an eye of a user of the NED device of FIG. 1.

FIG. 3A shows a waveguide 252a that has a single input pupil design, which can be mounted on the waveguide carrier 251 to convey light to a particular eye of the user, in this example, the right eye of user. A similar waveguide can be designed for the left eye, for example, as a (horizontal) mirror image of the waveguide shown in FIG. 3A. The waveguide 252a is transparent and, as can be seen from FIGS. 2A and 2B, would normally be disposed directly in front of the right eye of the user during operation of the NED device, e.g., as one of the waveguides 252 in FIG. 2A. The waveguide 252a is, therefore, shown from the user's perspective during operation of the NED device 140.

The waveguide 252a includes a single optical input port 310a (also called an in-coupling element, and corresponding to the single input pupil) located in the region of the waveguide 252a that is closest to the user's nose bridge when the NED device 140 is worn by the user. In certain embodiments the input port 310a is or includes a DOE which can include, for example a surface diffraction grating, volume diffraction grating, and/or a Switchable Bragg Grating (SBG). As will be described in more detail, in some embodiments, the input port 310a may include an element made of a metamaterial, also referred to herein as a metasurface. The waveguide 252a further includes an optical output port 330a (also called out-coupling element) and a transmission channel 320a. As with the input port 310a, in certain embodiments, the output port 330a is or includes a DOE which can include, for example a surface diffraction grating, volume diffraction grating, and/or an SBG. Similarly, in some embodiments, the output port 330a is or includes an element made of a metamaterial. A right-eye output port of the display module (not shown) is optically coupled (but not necessarily physically coupled) to the input port 310a of the waveguide 310. During operation, the display module 252 (not shown in FIG. 3A) outputs light representing an image for the right eye from its right-eye output port (not shown) into the input port 310a of the waveguide 252a.

The transmission channel 320a conveys light from the input port 311 to the output port 313 and may include, for example, a surface diffraction grating, volume diffraction grating, or a reflective component such as a substrate with multiple internally reflective surfaces. The transmission channel 320a may be designed to accomplish this by use of total internal reflection (TIR). Light representing the image for the right eye is then projected from the output port 330a to the user's eye.

Figure 3B:
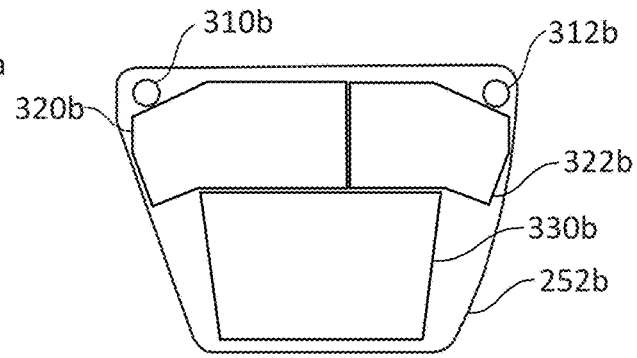
FIG. 3B shows an example waveguide with multiple optical input ports and a single optical output port configured to convey light to an eye of a user of the NED device of FIG. 1.

As shown in FIG. 3B, in some embodiments a waveguide may include multiple input ports 310b and 312b, for example to provide a greater overall FOV through multiplexing different FOVs of the projected image. Note that while the present disclosure describes waveguides with one or two input ports/pupils and a single output port/pupil, a display device incorporating the techniques introduced here may have a waveguide with more than two input ports/pupils and/or more than one output port/pupil for a given eye. Further, while the example of FIG. 3B is for the right eye, a similar waveguide can be designed for the left eye, for example, as a (horizontal) mirror image of the waveguide in FIG. 3B.

As shown in FIG. 3B, the waveguide 252b includes two separate input ports 310b and 312b, two transmission channels 320b and 322b, and an output port 330b. During operation, each of the input ports 310b, 312b receives light (from the display module 254) representing a different portion of the image for the right eye of the user. Each of the transmission channels 320b, 322b is optically coupled to a separate one of the input ports 310b or 312b and conveys light from only the corresponding input port 310b or 312b to the output port 330b. Each of the transmission channels 320b, 322b may be, for example, an internal or surface diffraction grating design to channel light by TIR. Light from the two different portions of the image is combined at the output port 330b and projected into the eye of the user as a single integrated image.

In some embodiments, the left input port 310b receives the left portion (e.g., half) of the image for one eye of the user (e.g., the right eye) while the right input port 312b receives the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252b could have more than two input ports, in which case the image could be provided to the waveguide 252b in the form of three or more separate image portions, which are reintegrated in the waveguide 252b.

Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3B. For example, the input ports could be spaced apart vertically on the waveguide rather than, or in addition to, horizontally. Other input port configurations are also possible.

Figure 3C:
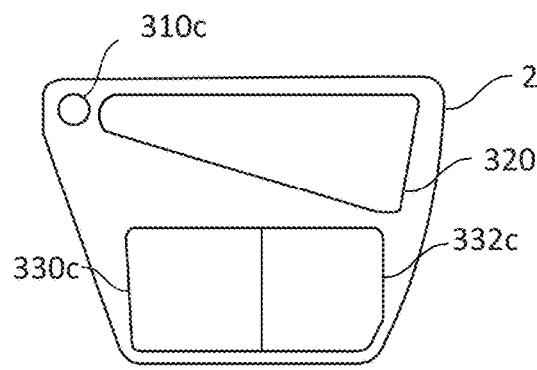
FIG. 3C shows an example waveguide with a single input and multiple outputs configured to convey light to an eye of a user of the NED device of FIG. 1.

As shown in FIG. 3C, in some embodiments a waveguide 252c may include multiple output ports 330c and 332c, for example to provide a greater overall field of view (FOV) through multiplexing different fields of view of the projected image. Note that while the present disclosure describes a waveguides with two output ports/pupils and a single input port/pupil, a display device incorporating the technique introduced here may have a waveguide with more than two input ports/pupils and/or more than two output ports/pupils for a given eye. Further, while the example of FIG. 3C is for the right eye, a similar waveguide can be designed for the left eye, for example, as a (horizontal) mirror image of the waveguide in FIG. 3C.

As shown in FIG. 3C, the waveguide 252c includes two separate output ports 330c and 332c, a transmission channel 320c, and an input port 310c. During operation, the input port 310c receives light (from the display module 254) representing a different portion of the image for the right eye of the user. The transmission channel 320c is optically coupled to the input port 310c and conveys light from the input port 310c to the output ports 330c and 332c. The transmission channels 320c may be, for example, an internal or surface diffraction grating design to channel light by TIR. Each of the two output ports 330c and 332c output light corresponding to one of two different portions of an image and project the respective protons of the image into the eye of the user as a single integrated image.

In some embodiments, the left output port 330c projects the left portion (e.g., half) of the image for one eye of the user (e.g., the right eye) while the right output port 332c projects the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252c could have more than two output ports, in which case the image can be projected to the eye of the user in the form of three or more separate image portions Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3C. For example, as shown in FIG. 3D, in some embodiments, an example waveguide 252d may include the input port 310d arranged between the multiple output ports 330d and 332d.

Figure 3D:
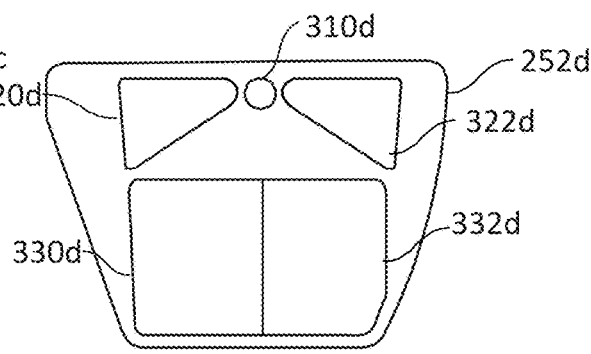
FIG. 3D shows an example waveguide with a single input arranged between multiple outputs configured to convey light to an eye of a user of the NED device of FIG. 1.

As shown in FIG. 3D, the waveguide 252d includes an input port 310d, two transmission channels 320d and 322d, and two separate output ports 330d and 332d. During operation, the input port 310d receives light (from the display module 254) representing a different portion of the image for the right eye of the user. The transmission channels 320d and 322d are optically coupled to the input port 310d and convey light from the input port 310d to the output ports 330d and 332d. The transmission channels 320d and 322d may be, for example, an internal or surface diffraction grating design to channel light by TI R. Each of the two output ports 330d and 332d output light corresponding to one of two different portions of an image and project the respective protons of the image into the eye of the user as a single integrated image In some embodiments, the output ports can be spaced apart vertically on the waveguide rather than, or in addition to, horizontally. Alternatively, in some embodiments, the multiple output ports of a waveguide may be overlaid over one another instead of oriented side by side as shown in FIGS. 3C and 3D. Other input and output port configurations are also possible.

Figure 4:
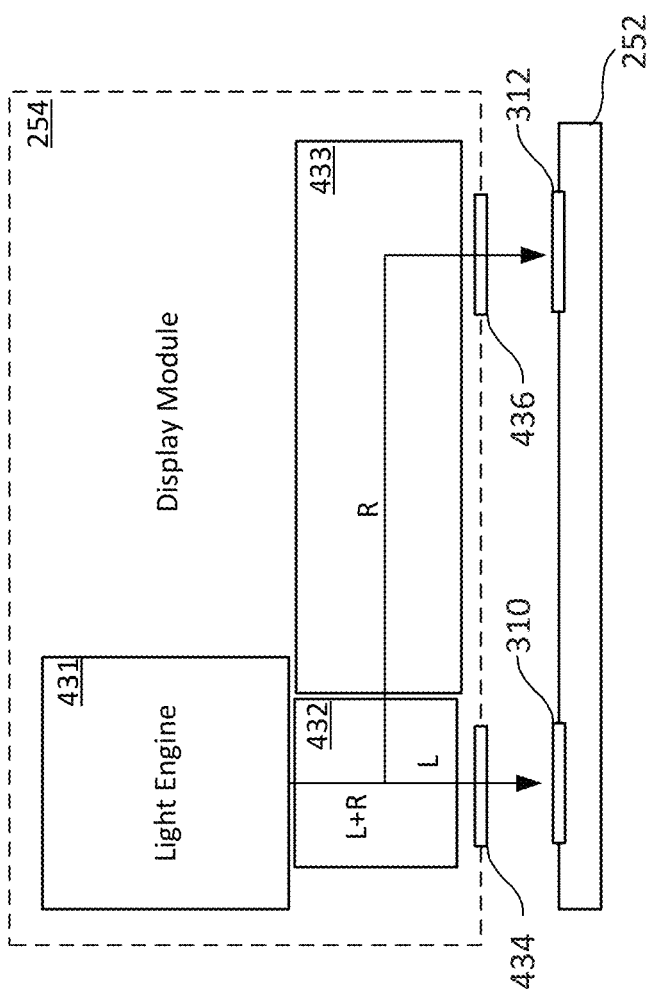
FIG. 4 is a schematic diagram that shows the components of an example display module that may be contained within the NED device of FIG. 1.

FIG. 4 schematically shows an example display module 254 configured for use with an NED device such as NED device 140 in FIG. 1, for example as shown in FIGS. 2A-2B. Note, that example display module 254 shown in FIG. 4 is configured for use with a dual input port waveguide as shown at example waveguide 252b in FIG. 3B. However, similar principles can be applied for a display module configured for use with fewer or more input ports, for example as shown at example waveguides 252a and 252c in FIGS. 3A and 3C (respectively).

As shown in FIG. 4, example display module 254 includes a light engine 431, an optical switch 432 and a pupil relay 433. Though not shown, the display module 254 may also include similar or identical components for the other eye of the user. In some embodiments, the light engine 431 includes one or more light sources (not shown), such as one or more colored LEDs. For example, the light engine 431 can include red, green and blue LEDs to produce the red, green and blue color components, respectively, of the image. Additionally, the light engine 431 includes at least one microdisplay imager (not shown), such as an LCOS imager, LCD or DMD; and may further include one or more lenses, beam splitters, waveguides, and/or other optical components (not shown).

The optical switch 432 controls the propagation direction of the light output by the light engine 431, representing each particular portion of the image, to one of two different optical paths. In the illustrated embodiment, the first path is for the left half of the image and leads to an output port 434 of the display module 254 that is coupled to one corresponding input port 310 of the waveguide 252. The other optical path is for the right portion of the image and includes a pupil relay 433, which propagates that portion of the image to a second output port 436 of the display module 254, which is optically coupled to a second corresponding input port 312 of the waveguide 252.

The optical switch 432 selectively controls the propagation direction of light from the light engine 431 based on a switching criterion, such as polarization. For example, one half of the image may have s-polarization while the other half of image has p-polarization, where the optical switch 432 conveys s-polarized light along one optical path and conveys p-polarized light along the other optical path. The switch 432 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths. The optical switch 432, therefore, enables a single light engine 431 to provide two pupils for an image to two separate in-coupling elements 310, 312 on a waveguide 252. In an example waveguide with only one input port, optical switch 432 may direct light emitted from light engine 431 to the single input port.

The pupil relay 433 is optional but enables larger distances between the input ports 310, 312 on the waveguide 252. The pupil relay 433 may be constructed using any known or convenient method and materials for transferring an image pupil from one location to another. For example, the pupil relay 433 may be constructed from a sequence of paraxial lenses that focus the pupil to an intermediate image and then collimate it, followed by a mirror to redirect the light into the corresponding input port of the waveguide.

Figure 5:
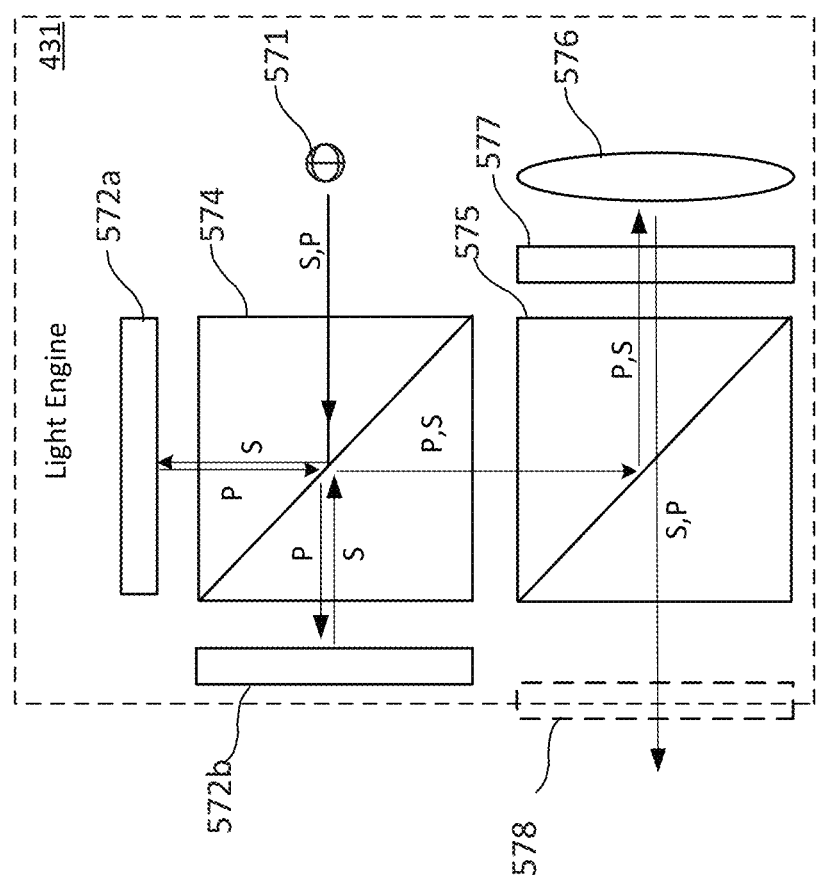
FIG. 5 is a schematic diagram that shows the components of an example light engine configured for use with the display module of FIG. 4.

FIG. 5 schematically illustrates an example light engine 431 including certain relevant components. The view in FIG. 5 is from the right side of the display module 254. Note that some embodiments may include other active and/or passive components, not shown. The light engine 431 in the illustrated embodiment includes at least one light source 571, such as a color LED. Although only one light source 571 is shown in FIG. 5, in practice there may be multiple light sources provided for each eye of the user, e.g., one for each color component of whatever color model is being employed (e.g., red, green and blue). The same or a similar configuration as shown in FIG. 5 can be used to combine light from such multiple light sources.

The light engine 431 further includes one or more imagers (e.g., LCOS microdisplays) 572a and 572b that generate an image intended for display to a particular eye of the user. Note that the example light engine 431 shown in FIG. 5 includes two imagers 572a and 572b, however another light engine may include one or more than two imagers. In the case of multiple imagers 572a and 572b, each imager may generate a portion of the image to be displayed to the user. A retarder (e.g., quarter-wave plate) can be placed before the waveguide at one of the waveguide inputs to have optimum polarization entering the waveguide.

Additionally, the light engine 431 can include a combination of polarizing beam splitters (PBSs) 574, 575, one or more reflective lenses 576 and one or more quarter-wave plates 577, that generate and propagate the image(s) through the output port 578 of the light engine 431. In the example shown in FIG. 5, a first PBS 574 reflects s-polarized light from the light source 571 upward to a first microdisplay imager 572a, which generates one portion of the image. The PBS 574 also causes p-polarized light from the light source 571 to be propagated straight through to the other microdisplay imager 572b, which produces a second portion of the image. Both portions of the image (separately constituting s-polarized and p-polarized light) then propagate downward through the PBS 574 to a second PBS 575, which directs them to birdbath-shaped reflective lenses 76 via quarter-wave plates (retarders) 577. The image portions are then reflected back by the reflective lenses 576 through the quarter-wave plates 577 and then through the PBS 575. From there, the image portions are output through the output port 578 of the light engine 431 and provided to additional optics in the display module 254, as shown by the example in FIG. 4.

Figure 6:
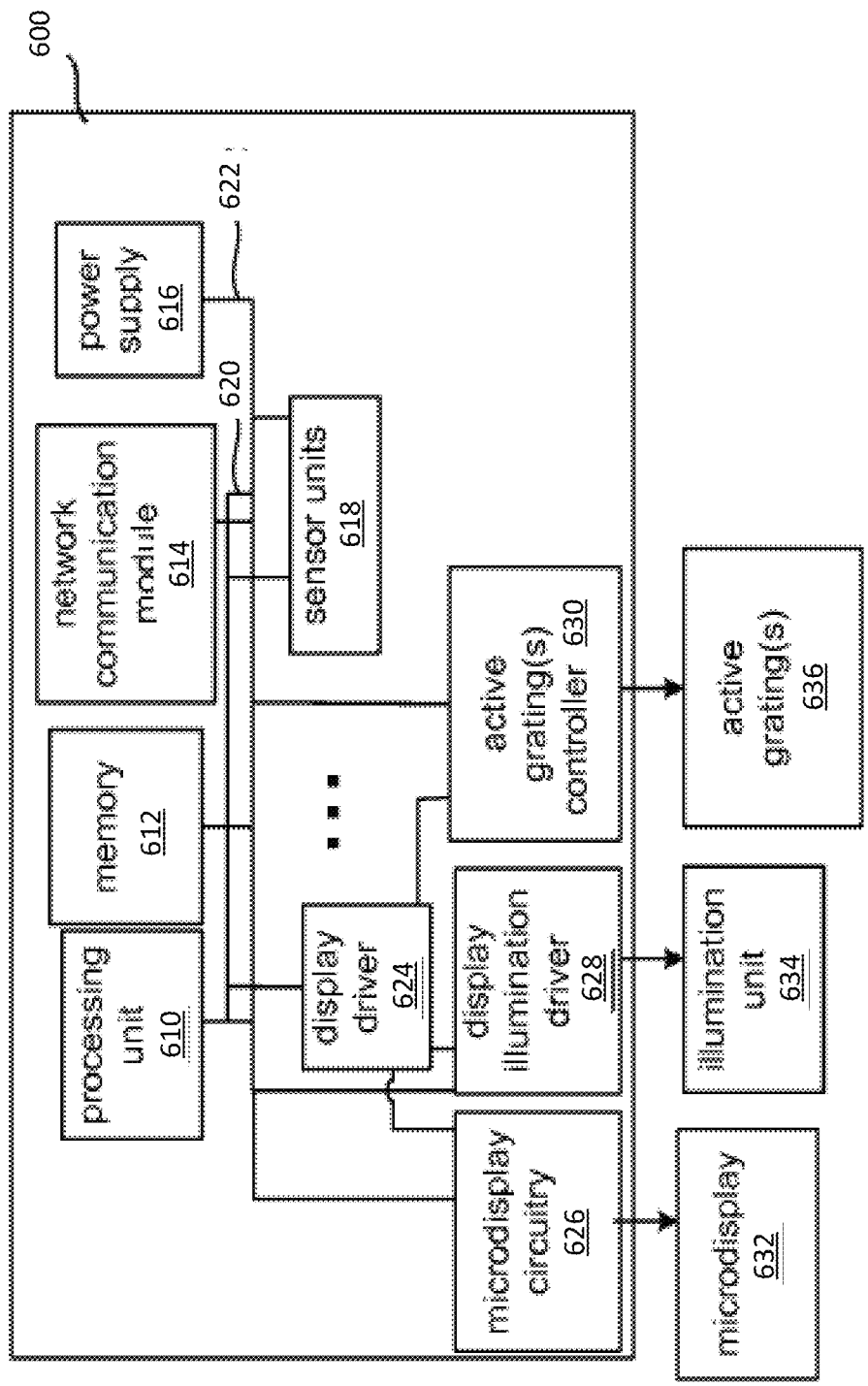
FIG. 6 is a block diagram of example hardware components including a computer system within control circuitry of the NED device of FIG. 1

FIG. 6 is a block diagram of example hardware components including a computer system within control circuitry 600 of an NED device 140. Control circuitry 600 provides various electronics that support the other components of NED device 140. In this example, the control circuitry 600 includes a processing unit 610, a memory 612 accessible to the processing unit 610 for storing processor readable instructions and data, and a communication module 614 communicatively coupled to the processing unit 610 which can act as a network interface for connecting the NED device to another computer system. A power supply 616 provides power for the components of the control circuitry 600 and the other components of the NED device 140 like sensor units 618 which may include, but are not limited to, image capture devices (e.g. cameras), audio capture devices (e.g. microphones), and location/motion capture devices (e.g. accelerometers).

The processing unit 610 may include one or more processors including a central processing unit (CPU) and/or a graphics processing unit (GPU). Memory 612 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications for which image light representing image data is generated. In this example, an electrical connection of a data bus 620 connects the sensor units 618, a display driver 624, processing unit 610, memory 612, and the communication module 614. The data bus 620 also derives power from the power supply 616 through a power bus 622 to which all the illustrated elements of the control circuitry are connected for drawing power.

The control circuitry 600 further includes the display driver 624 for selecting digital control data, e.g. control bits, to represent image data which digital control data may be decoded by microdisplay circuitry 626 and different active component drivers. An example of an active component driver is a display illumination driver 628 which converts digital control data to analog signals for driving an illumination unit 634 which includes one or more light sources (e.g., similar to light source 571 in FIG. 5) like one or more light emitting diodes (LEDs). A microdisplay 632 may be an active transmissive, emissive, or reflective device. For example, microdisplay 632 may be similar to the one or more imagers 572a-b described with reference to FIG. 5. Microdisplay 632 may be a liquid crystal on silicon (LCoS) device requiring power or a micromechanical machine (i) based device requiring power to move individual mirrors. In some embodiments, a waveguide display may include one or more active gratings 636 such as an SBG. An active grating(s) controller 630 converts digital control data into signals for changing the properties of one or more active gratings 636.

In some embodiments discussed below, the control circuitry 600 may include other control units not illustrated here but related to other functions of an NED device 140 device such as, for example, polarization control, providing audio output, identifying head orientation and location information. In other embodiments, some of the processing and memory resources identified in FIG. 6 can be shared between the control circuitry 600 and a companion processing module embodied in, for example, a mobile device (e.g. a smart phone) communicatively coupled to the NED device 140.

Figure 7:
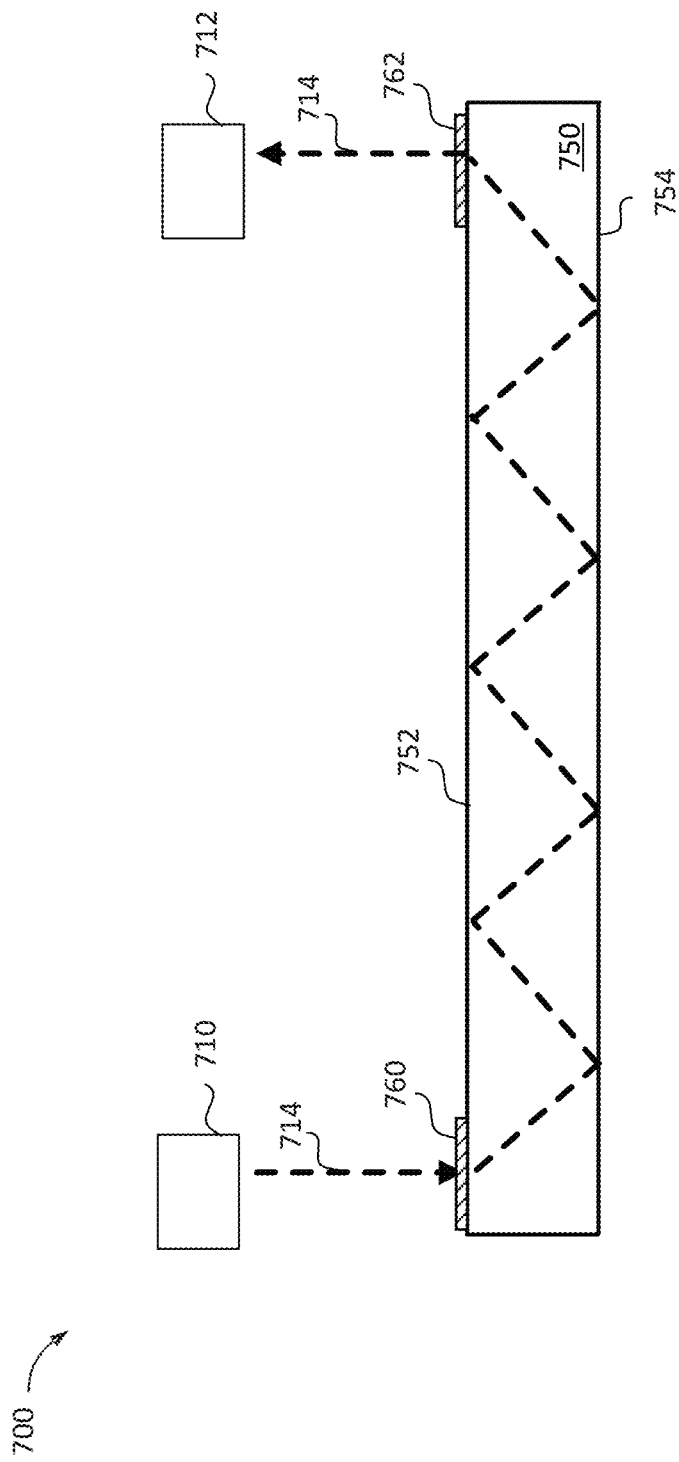
FIG. 7 illustrates the propagation of light rays in a waveguide.

FIG. 7 illustrates the propagation of light rays in a pupil relay using in-coupling and out-coupling elements on a waveguide substrate. As previously discussed with respect to FIGS. 3A-3B, in some embodiments the in-coupling and out-coupling elements may be diffractive optical elements (e.g., an SRG). The term "pupil relay" describes the system of components used to spatially transfer a pupil from one location to another, for example from entry pupil 710 to exit pupil 712. In some embodiments, the pupil relay includes a waveguide with optical properties such that the entry pupil and exit pupil of the waveguide have substantially identical size and shape, and such that light rays input to the pupil relay propagate through the pupil relay by total internal reflection (TIR), so that the corresponding output light rays have substantially identical properties to those of the input light rays. In this context, "substantially identical" means that there is no perceivable difference in these properties to a human user. In other embodiments, the optical properties of the entry pupil may differ from the optical properties of the exit pupil, for example, for pupil expansion.

As shown in FIG. 7, in some embodiments, a pupil relay is a waveguide 700 that includes a light-transmissive substrate 750 with at least two surfaces 752 and 754 that are substantially parallel to each other and that are internally reflective so as to provide TIR of light rays 714 propagating within the substrate 750. Waveguide 700 also includes an in-coupling element 760 configured to input light rays 714 to the substrate 750, for example, by diffracting the light rays 714 at an angle suitable for TIR. Waveguide 700 also includes an out-coupling element 762 configured to output light rays 714 from the substrate 750. As previously discussed, the in-coupling element 760 and out-coupling element 762 may in some cases include DOEs such as a surface relief diffraction gratings (SRG) formed as part of or proximate to a given surface (i.e., a surface parallel to the direction of propagation of the light rays within the substrate) of the substrate 750. For example, the embodiment illustrated in FIG. 7 shows in-coupling element 760 and out-coupling element 762 formed on or proximate to surface 752 of the substrate 750. In this description, "proximate to" means within one micrometer from the surface (above or below). It may be desirable to make the depth of each DOE relatively large compared to its period.

In the embodiment of FIG. 7, the substrate 750 can be made of any material or combination of materials with appropriate optical properties to facilitate light propagation by TIR. In some embodiments, substrate 750 is made of optical-grade glass, for example, formed through an injection molding process. The glass used to form the substrate 750 can, in some embodiments, include silicon dioxide ($SiO_2$). Alternatively, in some embodiments, the substrate may be formed of a polymer resin. As mentioned, the DOEs 760 and 762 may include surface relief gratings (SRG). In such embodiments, an SRG can be part of a surface of the substrate 750 (e.g. formed through etching into a surface of substrate 750 or formed during an injection molding process), can be formed on a surface of substrate 750 (e.g. through application and curing of material on the surface), or can be buried within the substrate 750. It can be assumed, in such embodiments, that each DOE in the pupil relay is substantially coplanar with at least one of the surfaces of the substrate that are parallel to the long axis of the pupil relay (i.e., each DOE is parallel to such surface and within one micrometer of depth of such surface).

As previously discussed, in-coupling and out-coupling elements in a waveguide input light rays to the waveguide and output light rays from the waveguide by deflecting the light rays, for example through diffraction caused by a DOE such as an SRG. However, light rays at different wavelengths will deflect at different angles when passing through a DOE such as an SRG. This phenomenon is commonly referred to as dispersion. In the context of a waveguide for an NED device, dispersion can impact the ability to effectively propagate polychromatic light rays collinearly through a pupil relay. Without corrective features, a polychromatic image input at an entry pupil may appear distorted to a user at the exit pupil. For example, due to dispersion the polychromatic image projected at the exit pupil may exhibit a rainbow effect. Further, without corrective features, dispersion may lead to limited FOV for light rays of certain wavelengths.

Figure 8:
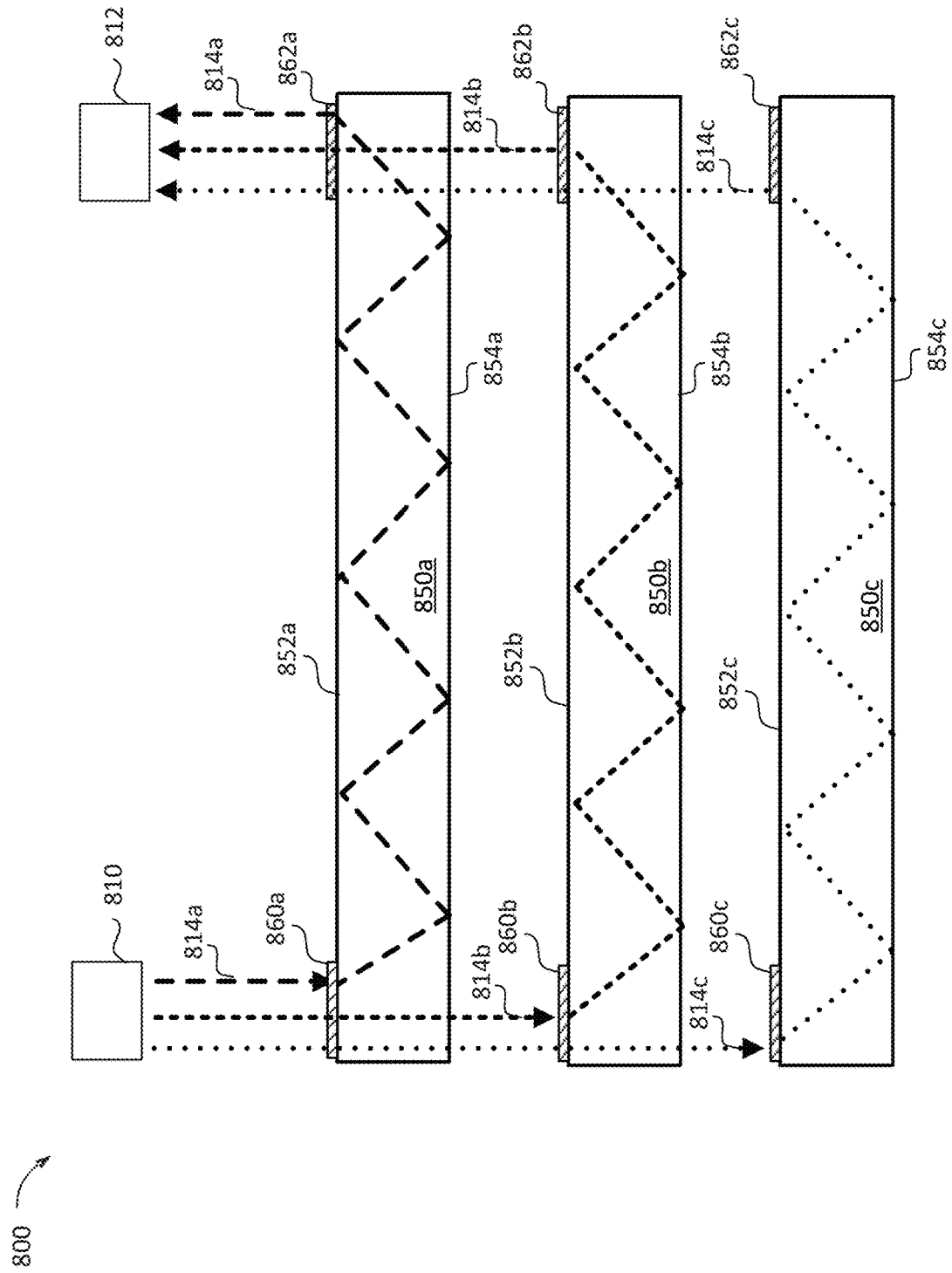
FIG. 8 shows a pupil relay including three substrates, each configured to propagate light of a particular component color.

FIG. 8 illustrates one example of a technique for propagation of polychromatic light rays in a pupil relay. As shown in FIG. 8, a waveguide 800 may include multiple substrates, each configured to propagate a particular component of light from an entry pupil 810 to an exit pupil 812. For example, pupil relay 800 may be configured to propagate a red component, a green component, and a blue component of an image from entry pupil 810 to exit pupil 812. Specifically, the waveguide 800 includes a multiple layered substrates 850*a-c*, each having a at least two surfaces 852*a-c* and 854*a-c* that are substantially parallel to each other and that are internally reflective so as to provide TIR of light rays of a particular color 814*a-c* (e.g. red, green, and blue, respectively) propagating within the substrates 850*a-c*.

As shown in FIG. 8, each of the multiple substrates 850*a-c* has an in-coupling element 860*a-c* configured to input light rays of a particular component of color (i.e., of a particular wavelength) into its respective substrate 850*a-c*. For example, in an embodiment, light rays 814*a* for a red component are in-coupled to substrate 850*a* via element 860*a*, light rays 814*b* for a green component are in-coupled to substrate 850*b* via element 860*b*, and light rays 814*c* for a blue component are in-coupled to substrate 850*c* via element 860*c*. As further shown in FIG. 8, each of the multiple substrates 850*a-c* has an out-coupling element 862*a-c* configured to output light rays of a particular component of color (i.e., of a particular wavelength) from its respective substrate 850*a-c*. For example, in an embodiment, light rays 814*a* for a red component are out-coupled from substrate 850*a* via element 862*a*, light rays 814*b* for a green component are out-coupled from substrate 850*b* via element 862*b*, and light rays 814*c* for a blue component are out-coupled from substrate 850*c* via element 862*c*. As previously discussed, the in-coupling elements 860*a-c* and out-coupling elements 862*a-c* may in some cases include DOEs such as a surface relief diffraction gratings (SRG) formed as part of or proximate to a given surface (i.e., a surface parallel to the direction of propagation of the light rays within the substrate) of the respective substrate 850*a-c*. Here, each DOE may be designed to in-couple and/or out-couple light rays of a particular component color for TIR and a maximum FOV.

The example waveguide 800 described with respect to FIG. 8 can be effective in propagating polychromatic light rays from an entry pupil to an exit pupil. However, including multiple substrate layers to propagate the multiple component colors of a color image can introduce undesirable weight, complexity, and/or cost in an NED device.

Figure 9A:
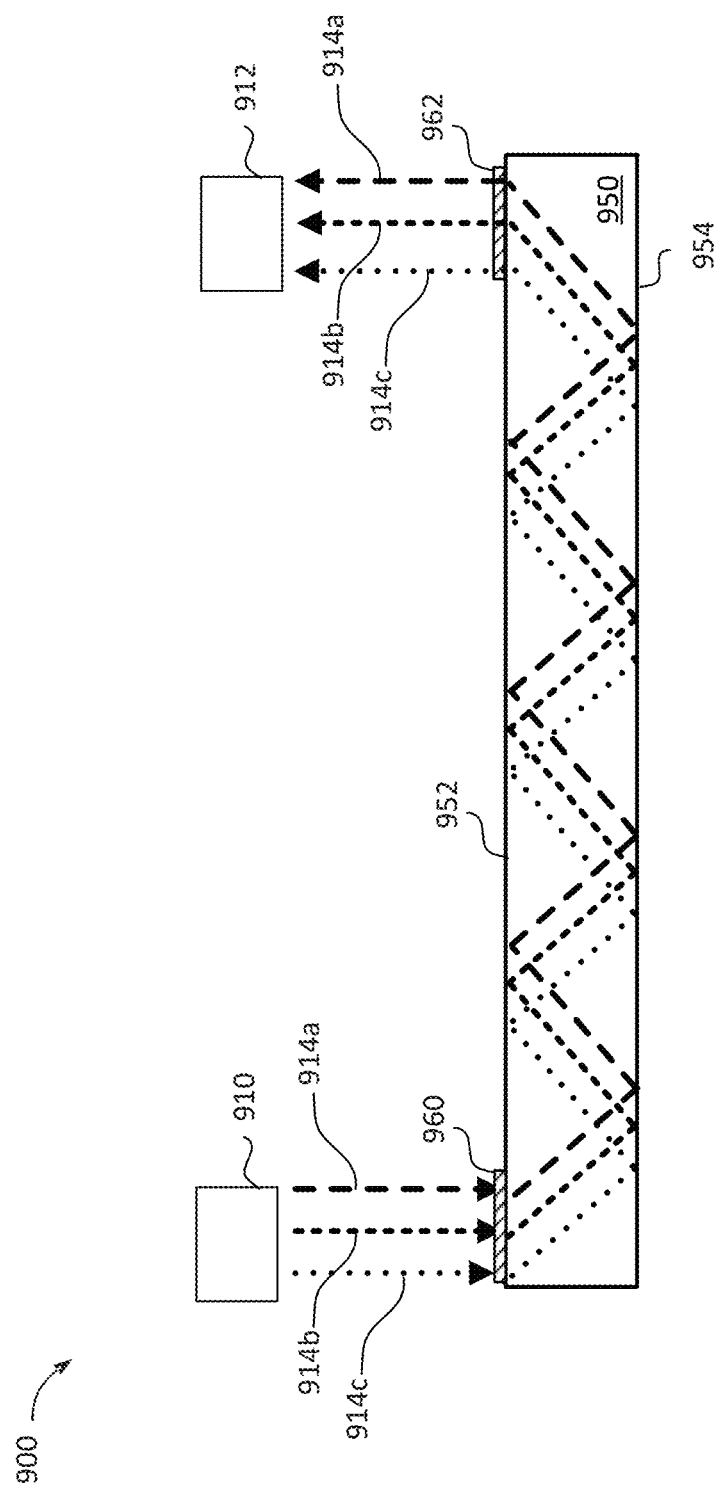
FIG. 9A shows an example waveguide including a single substrate configured to propagate polychromatic light.

FIG. 9A illustrates an embodiment of waveguide 900 configured to address the issue of dispersion that includes a single substrate for propagating light having multiple wavelengths (i.e. colors) from an entry pupil to an exit pupil. As shown in FIG. 9A, the example waveguide 900 includes a substrate 950, an in-coupling element 960, and an out-coupling element 962. As with the substrates described with respect to FIGS. 7 and 8, substrate 950 includes at least two surfaces 952 and 954 that are substantially parallel to each other and that are internally reflective so as to allow for TIR of propagating light rays. Substrate 950 can be made of any light-transmissive material or combination of materials with appropriate optical properties to facilitate light propagation through TIR. In some embodiments, substrate 950 is made of glass, for example, formed through an injection molding process. The glass used to form the substrate 950 can, in some embodiments, include silicon dioxide ($SiO_2$). Alternatively, in some embodiments, the substrate may be formed of a polymer resin.

In the example embodiment depicted in FIG. 9A, collinear light rays 914*a-c* having different wavelengths (i.e., colors) enter substrate 950, from an entry pupil 910, via the in-coupling element 960. The in-coupling element 960 is configured to deflect a plurality of wavelengths of an incident light ray collinearly for propagation via the light transmissive substrate 950 through TIR. In other words, the in-coupling element 960 can be considered achromatic in that it is configured to in-couple light without separating the incoming light into its constituent colors (e.g. through dispersion). Since the incoming light rays 914*a-c* are deflected collinearly by the in-coupling element 960, they propagate collinearly through the substrate 950 by internally reflecting off of surfaces 952 and 954, as shown in FIG. 9A.

In the example depicted in FIG. 9A, light rays 914*a-c* may represent component colors of light generated by one or more imagers of a display module 254 in an NED device 140. In some embodiments, color images are generated by projecting light in a plurality of component colors according to a color model. For example, the RGB color model is commonly employed in various imaging applications to reproduce a wide range of colors. Using the RGB color model, an imager may generate three different colors of light rays. Specifically, the imager may generate light falling within a red spectrum, a green spectrum, and a blue spectrum. Note, that the light generated within any particular spectrum may itself include light at a plurality of wavelengths.

Similar to the in-coupling element 960, the out-coupling element 962 may be configured so as to deflect a plurality of wavelengths of an incident light ray propagated through the substrate 950 collinearly out of the substrate towards an exit pupil 912. For example, the exit pupil 912 may represent an eye of a user of an NED device. Again, the out-coupling element 962 may in this sense be considered achromatic.

Note that the light rays 914*a-c* shown in FIG. 9A only represent a particular angle of incidence. In practice, light rays at varying angles of incidence would enter the substrate 950 via the in-coupling element 960 and exit the substrate 950 at out-coupling element 962, resulting in a visible FOV of a translated image. Accordingly, to maximize the effective FOV of a resulting image displayed via the waveguide 900, the in-coupling element 960 and out-coupling element 962 can be designed with a goal of deflecting a maximum range of incoming light at angles suitable for propagation through TIR via the substrate 950.

As previously discussed, it is generally not desirable to use a periodic diffraction grating (e.g. an SRG) to in-couple and out-couple varying wavelengths of light in a waveguide display. This is because the diffractive effect of an SRG used to deflect incident light rays results in dispersion of those light rays. This means that different colors of light are deflected at different angles at the coupling interface and that confinement through TIR (needed to propagate the light) is not possible over a sufficiently wide FOV. Instead, other types of optical elements are needed to in-couple and out-couple light to achieve a translated FOV sufficient for use in an NED device. Generally speaking, a waveguide display in an NED device should allow for an overall effective FOV of at least 30 degrees. Note that this can be accomplished in single waveguide configuration in a number of ways, including the multiple input/output configurations described with respect to FIGS. 3A-3C.

In some embodiments, an optical coupling element in a waveguide can be implemented that includes one or more elements formed of metamaterials. In general, an optical metamaterial (also referred to as a photonic metamaterial) can be defined as any composition of sub-wavelength structures arranged to modify the optical response of an interface. In conventional materials, the optical response is determined by the atoms in the material. For example, even in the case of an SRG, the diffractive response is based at least in part on the refractive index of the material forming the grating structures of the SRG. In an optical metamaterial, the optical response instead depends on the arrangement of the sub-wavelength structures. Accordingly metamaterials can be engineered to exhibit optical properties not otherwise available in any other naturally occurring materials.

A metasurface can include a dense arrangement of sub-wavelength structures arranged to introduce a phase shift in an incident wavefront, thereby allowing for precise control of the deflection of light rays. This ability to control the deflection of light rays can also be applied to optical coupling elements in a pupil relay system. For example, FIG. 9B shows a detail 980 of a the example coupling element 960 described with respect to FIG. 9A that includes a pattern of structures 966 that collectively form a metasurface arranged on or proximate to a surface 952 of the substrate 950. The example structures depicted in detail 980 are shown with exaggerated features for illustrative purposes. The details are not intended to impart limitation with respect to the number, shape, arrangement, orientation, or dimensions of the features of the corresponding optical element. In other embodiments, element 960 may have different structure patterns. As shown in FIG. 9B, and as described with respect to FIG. 9A, the metasurface-based coupling element 960 can be designed to deflect multiple wavelengths of an incident light ray at the same angle to enable collinear propagation through the substrate 950 through TIR. In other words a light rays of different colors entering the substrate 950 at a particular angle will deflect at the same angel via the coupling element, thereby enabling collinear propagation through the substrate by TIR. Note, the example arrangement of structures 966 depicted in detail 980 are shown for illustrative purposes and do not necessarily represent an arrangement suited for a particular waveguide display. For example, detail 980 depicts an optical element having a single layer metasurface 966. In some embodiments an optical coupling element configured to in-couple or out-couple multiple component colors of light may include multiple layered metasurfaces, each designed to be "seen" by a particular spectral band (e.g. red, green, blue, etc.) of light. Each of the layered metasurfaces in such a configuration may be designed to deflect incident light falling within the particular spectral band at a particular angle.

Figure 10C:
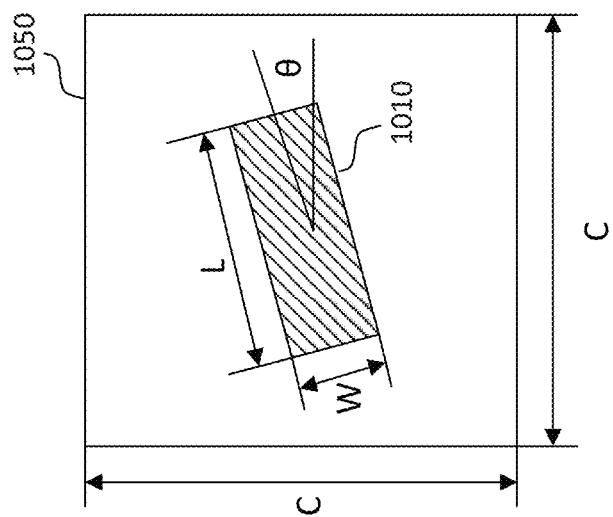
FIG. 10C shows a top view of the example structure of FIG. 10A.
Figure 10B:
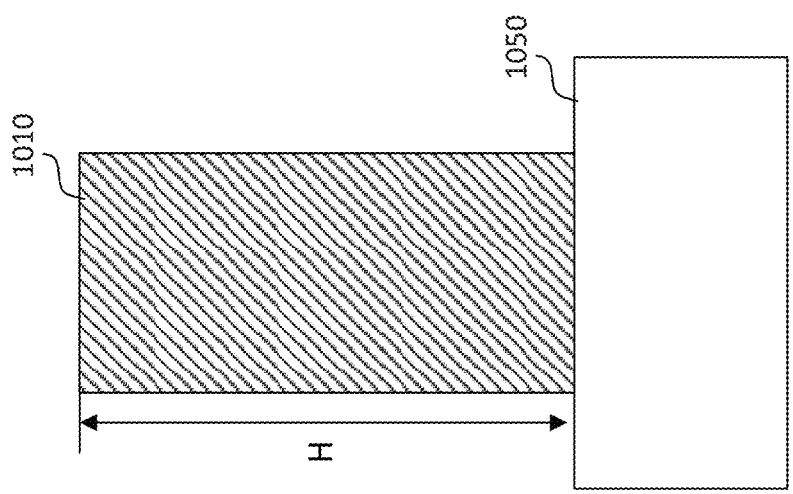
FIG. 10B shows a side view of the example structure of FIG. 10A.
Figure 10A:
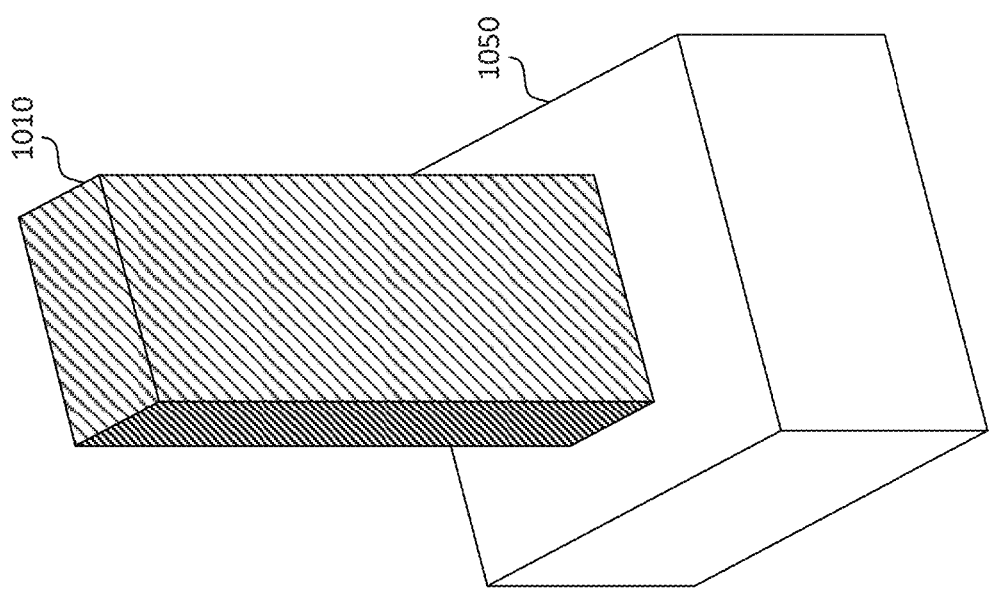
FIG. 10A shows an isometric view of an example structure that can be part of a metasurface in an optical coupling element of the waveguide of FIG. 9A.
Figure 13A:
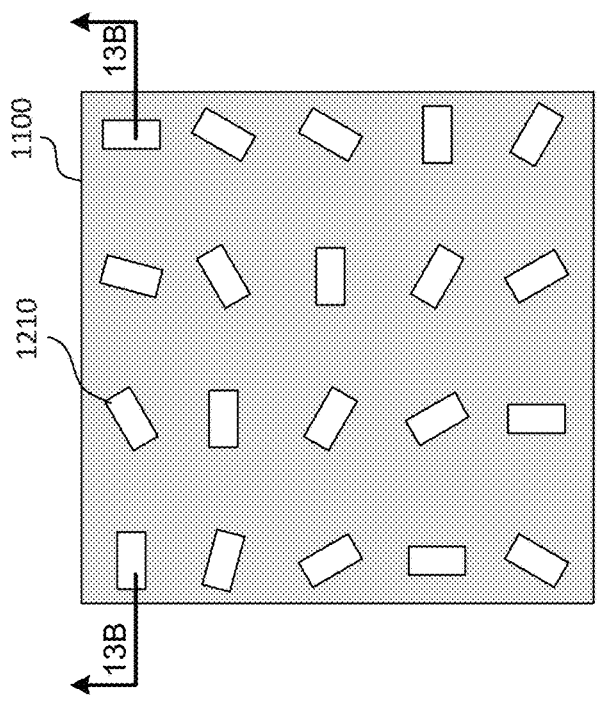
FIG. 13A shows a second top view of the portion of the substrate of FIG. 11 with a pattern of the resist material removed.
Figure 13B:
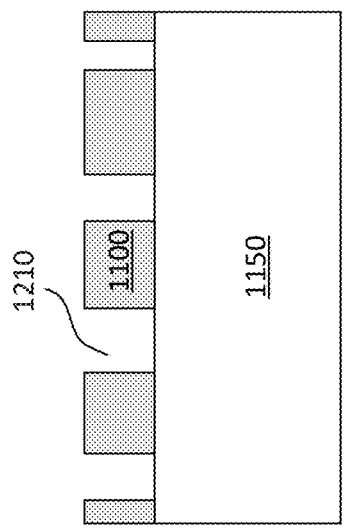
FIG. 13B shows a cross-sectional view corresponding to the top view of FIG. 13A.

FIGS. 10A-10C show various views of an example structure 1010 that when arranged in a pattern (e.g. as shown in detail 980 of FIG. 9B) may form a metasurface suitable for use in an optical coupling element. Specifically, FIG. 10A shows an isometric view of an example structure 1010 arranged relative to a substrate base 1050, FIG. 10B shows a side view of the example structural element 1010 arranged relative to the substrate base 1050, and FIG. 10C shows a top view of the example structure 1010 arranged relative to the substrate base 1050. The substrate base 1050 depicted in FIGS. 10A-10C may represent a portion of the substrate 950 of the example waveguide 900 depicted in FIGS. 9A-9B. The combination of the structure 1010 and the portion of substrate may be referred to as a unit cell of the metasurface having dimensions C×C.

The structural element 1010 of FIGS. 10A-10C is depicted in the example form of a "nanofin" that is formed on (or proximate to) a surface of the substrate 1050. However, the present innovations are not limited to nanofin-based metasurfaces. As will be described, the structures forming a given metasurface may include any type of nanostructures. As shown in FIGS. 10A-10C, any given unit cell of an example metasurface may include a structural element 1010 having a height H, a width W, a length L, and a relative angle of orientation θ. In some embodiments the above listed dimensions of any given structural element in a unit cell of a metasurface will vary across the metasurface, for example, as shows in detail 980 in FIG. 9B. Further, the example structure 1010 depicted in FIGS. 10A-10C is not necessarily shown to scale. The ratios between dimensions listed in FIGS. 10A-10C will vary depending on the requirements or a particular implementation. Further, nano-structures in other embodiments may not exhibit the same or similar cuboid shape as depicted with respect to structure 1010 shown in FIGS. 10A-10C. In other such embodiments structures forming a metasurface may take on different, and in some cases, more complex shapes, limited only by the manufacturing technique employed to produce the structures.

As previously mentioned, the structure depicted in FIGS. 10A-10C can generally be characterized as a nanofin. However, in some embodiments the structures forming a given metasurface may include other types of nanostructures such as nanopillars, nanoantennae (e.g., v-shaped, etc.), nanorods, nanowires, and other types of nano-strucutres. For example in some embodiments, a metasurface may include nanopillars. In such embodiments, each nanopillar may comprise a generally cylindrical structure having a circular or elliptical cross section and a height. In some embodiments, each nanopillar comprise a wider cross section at the base and taper towards a smaller cross section at the top. The nanopillars forming a given metasurface can be designed to effect circular and or elliptical polarization of incident light waves. In other embodiments, a metasurface may include a resonant grating formed of a series (periodic and/or aperiodic) of nanowires arranged on a surface of a substrate. The type, size, and arrangement of nanostructures included in a given metasurface will depend on the desired optical properties. As previously discussed, the structures forming a given metasurface of an optical coupling element may generally be referred to as "sub-wavelength" structures. In other words, in some embodiments, the spacing between structures in a given pattern of structures may be smaller than select wavelengths of light. For example, in an embodiment, an optical coupling element 960, 962 may be configured to in-couple and/or out-couple light rays in the red spectrum (~650 nm wavelength), green spectrum (~520 nm wavelength), and blue spectrum (~460 nm wavelength). A metasurface configured to deflect the light in these component wavelengths may include unit cells of nano-structures having roughly the following dimensions: C~150 nm, H~1000 nm, W~25 nm, and L~75 nm. Note that these example dimensions are provided only to illustrate the general scale of the structures forming a metasurface relative to the wavelengths of light in question. As mentioned, in practice, the dimensions of the structures forming the metasurface will depend heavily on many factors particular to a given implementation, including material of the nano-structure, material of the substrate, dimensions of the substrate, and imaging requirements (e.g., color, resolution, FOV, etc.). Further the dimensions of the multiple individual structures forming a metasurface in an optical coupling element may vary across an area of the metasurface.

FIGS. 11-16B illustrate an example method for manufacturing a metasurface associated with an optical coupling element in a waveguide display, according to some embodiments. The example method of manufacture depicted in FIGS. 11-16B is generally categorized as electron beam lithography, however a person having ordinary skill will recognized that other manufacturing techniques may also be applied, including other lithography techniques (e.g., photolithography, x-ray lithography, ion beam lithography, etc.), nanomanipulation (e.g., molecular self-assembly), 3D printing of nano-structures, and/or etching into the substrate.

FIG. 11 shows an isometric view of a portion of a substrate 1150 during a first step of the example fabrication process. Substrate 1150 may be similar to substrate 950 described with respect to FIGS. 9A-9B. In other words, substrate 1150 may include at least two surfaces that are substantially parallel to each other and that are internally reflective so as to provide TIR of propagating light rays. Substrate 1150 can be made of any light-transmissive material or combination of materials with appropriate optical properties to facilitate light propagation through TIR. In some embodiments, substrate 1150 is made of glass, for example, formed through an injection molding process. The glass used to form the substrate 1150 can, in some embodiments, include silicon dioxide ($SiO_2$). Alternatively, in some embodiments, the substrate may be formed of a polymer resin.

As shown in FIG. 11, during a first step, a layer of resist material 1100 is deposited on at least a portion of a surface of the substrate 1150. In some embodiments the layer of resist material 1100 is a thin layer of electron-sensitive film. A commonly used resist material in electron beam lithography is polymethyl methacrylate ("PMMA"). The layer of resist material 1100 applied to the substrate 1150 may have a thickness "t" generally in line with the desired height of the resulting metasurface structures. For example, in an embodiment, a layer of resist 1100 approximately 1000 nm thick is deposited on the portion of the substrate 1150 to produce metasurface structures that area approximately 1000 nm high.

One or more beams of electrons are applied to the layer of electron-sensitive resist material to form a pattern in the resist material corresponding to the desired pattern of metasurface structures. For example, FIG. 12 shows a top view of the portion of substrate 1150 with the layer or resist 1100 after application of the electron beam(s). As shown in FIG. 12, the areas removed from the resist material 1210 will correspond to the eventual pattern of metasurface structures. For example, as shown in detail 1280, a particular carved out area 1210 corresponding to a single metasurface structure may have a width "W" corresponding to the width of the desired metasurface structure. This is further illustrated in the top view shown in FIG. 13A with the corresponding section view shown at FIG. 13B.

Figure 14A:
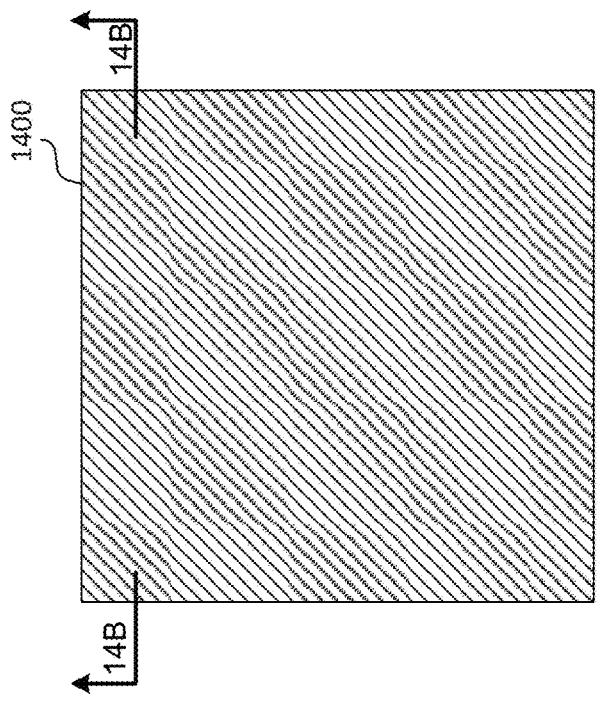
FIG. 14A shows a top view of the portion of substrate of FIG. 11 with a layer of dielectric material applied over the pattern in the resist during a third step of the example process for fabricating a metasurface.
Figure 14B:
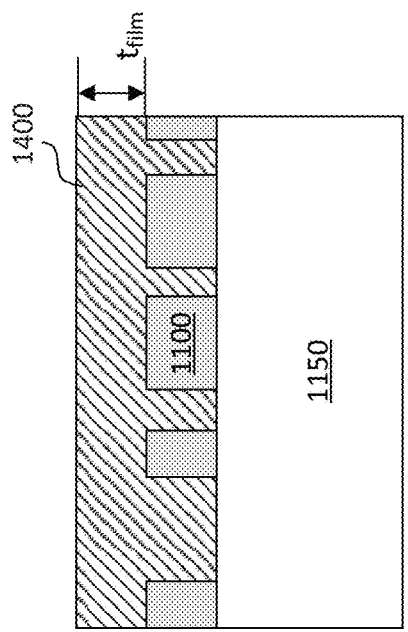
FIG. 14B shows a cross-sectional view corresponding to the top view of FIG. 14A.

A layer of material 1400 is then deposited over the patterned layer of resist 1100 to fill the removed areas 1210. For example, FIG. 14A shows a top view of the portion of substrate 1150 with the applied layer of material 1400 and FIG. 14B shows a corresponding section view. In some embodiments, the structures forming the pattern of structures in a metamaterial include dielectric resonators.

Accordingly, the layer of material 1400 can include a dielectric material such as titanium dioxide (TiO$_2$). In some embodiments the layer of titanium dioxide can be applied through a process of atomic layer deposition (ALD). If ALD is used to deposit the layer of material 1400 over the resist 1100, the layer of material 1400 above the resist 1000 should be at least W/2 (where W is the width of the resulting structure) to produce void free metasurface structures.

After depositing the layer of material 1400, portions of the deposited material 1400 above the layer of resist 1100 are removed, for example, by controlled blanket reactive ion etching. For example, FIG. 15A shows a top view of the portion of substrate 1150 with the layer of patterned resist material 1100 and structures 1410 made of the filled material 1400. FIG. 15B shows a corresponding section view.

Finally any remaining resist material 1100 is stripped leaving the formed metasurface structures 1410 arranged in a pattern to form a metasurface on the substrate 1150. For example, FIG. 16A shows a top view of the portion of substrate 1150 with the layer of resist material 1100 removed leaving only the pattern of metasurface structures 1410. FIG. 16B shows a corresponding section view.

In FIGS. 9A and 9B, an example waveguide is introduced that includes metasurface-based optical elements configured to in-couple multiple colors of light for propagation though a single substrate and out-couple that propagated light towards an eye of a user of an NED device. In practice, metasurfaces can be effective at precisely controlling the optical response of incident light rays at interface, however they become less effective at doing so at more extreme angles of incidence. For example, in some cases, a coupling element with metasurface structures made of titanium dioxide that are less than 1000 nm in height may not be able to provide coverage over an acceptable FOV (e.g., at least 35 degrees for an NED device) for red, blue, and green component light rays. Metamaterial fabrication processes are constantly improving, however, current fabrication techniques may, in some cases, not be best suited to forming the necessary patterns of structures in an efficient and cost effective manner. This can limit their applicability to mass produced consumer products.

Instead, alternative techniques can be implemented to remedy current limitations in the fabrication of optical coupling elements using metasurfaces. For example, FIGS. 17A and 17B illustrate embodiments that include metasurface coupling elements arranged on two substrates instead of one.

Figure 17A:
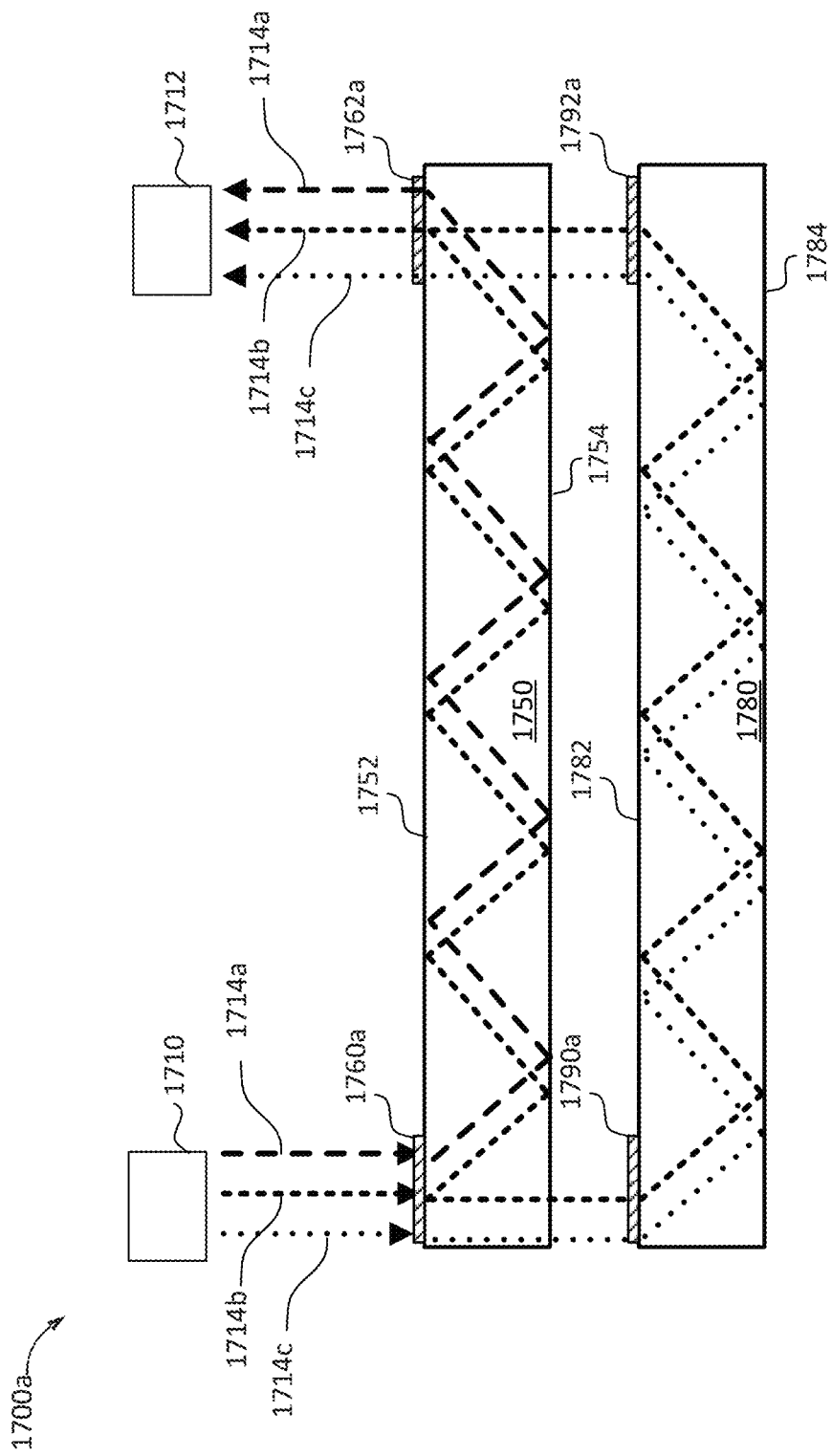
FIG. 17A shows a first example waveguide including multiple substrates configured to propagate polychromatic light.
Figure 17B:
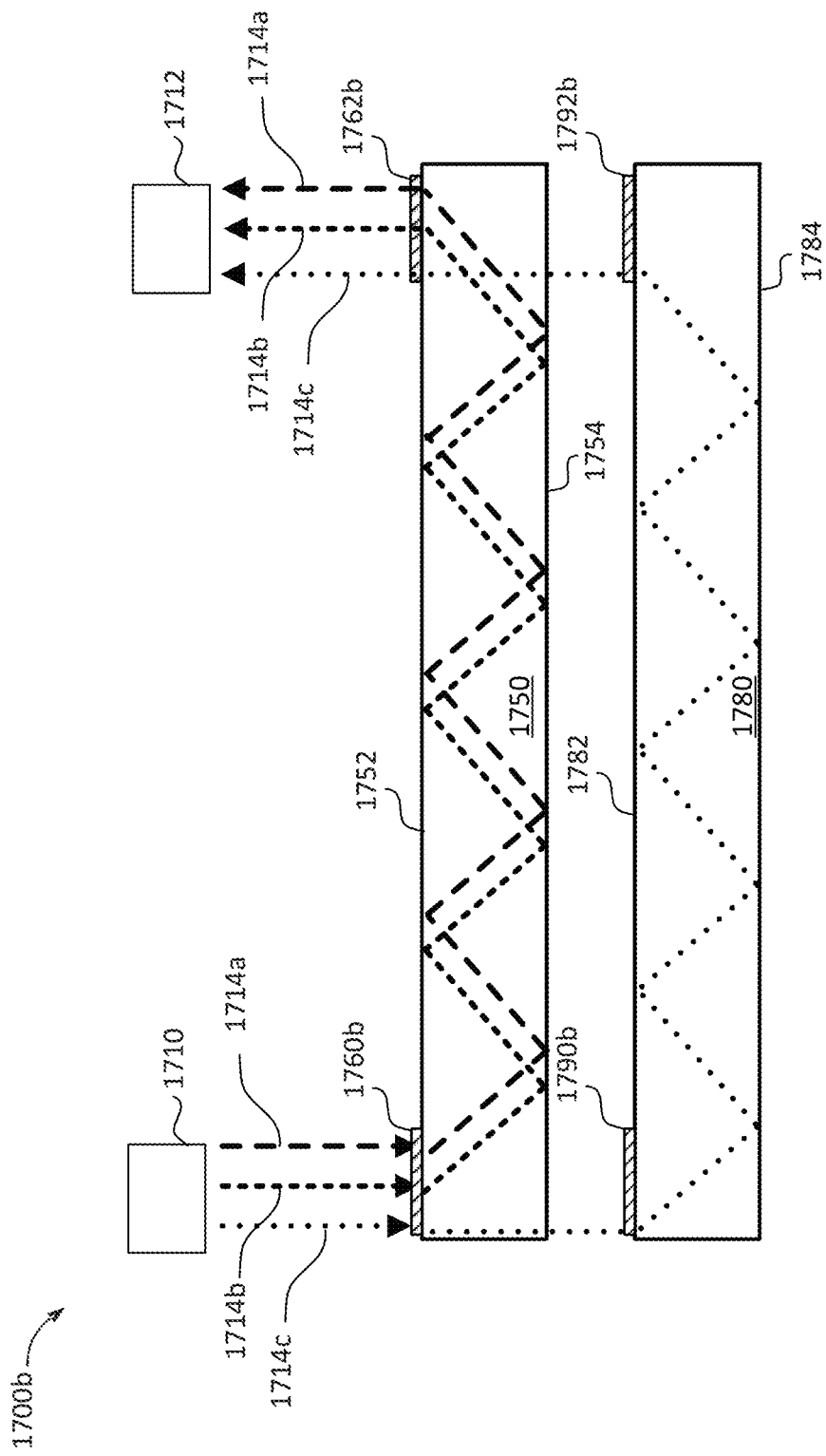
FIG. 17B shows a second example waveguide including multiple substrates configured to propagate polychromatic light.

In a first embodiment depicted in FIG. 17A, an optical waveguide 1700a includes a first substrate 1750 with metasurface optical coupling elements 1760a and 1762a. The optical waveguide 1700a further includes a second substrate 1780 that also includes metasurface optical coupling elements 1790a and 1792a. The waveguide 1700a depicted in FIG. 17A utilizes metasurfaces like the waveguide 900 depicted in FIGS. 9A-9B, but instead splits propagation of certain wavelengths of incident light among the two substrates 1750 and 1780. Specifically, waveguide 1700a propagates light falling within a first wavelength (e.g., blue light) via the first substrate 1750, propagates light falling within a second wavelength (e.g., red light) via the second substrate 1780, and then splits propagation of light falling within a third wavelength (e.g., green light) among the two substrates 1750 and 1780. In the example embodiment this can be referred to a BG-RG system in that one substrate propagates blue light and a first component (e.g., a partial FOV) of green light and a second substrate propagates red light and a second component (a partial FOV) of green light. By splitting the coupling of multiple wavelengths of light among two substrates, the metasurfaces used as coupling elements can be configured to more effectively in-couple and out-couple particular components of light (e.g., particular wavelengths and particular angles of incidence) while still reducing overall system complexity and weight as compared to a three plate design.

The example of a BG-RG system is described with respect to FIG. 17A for illustrative purposes, however it is not to be construed as limiting. In other embodiments, different combinations of components of light may be propagated via the multiple substrates. Further, in some embodiments more than two substrates may be utilized, for example, similar to the waveguide 800 described with respect to FIG. 8. In other embodiments multiple in-coupling and out-coupling elements may be arranged on opposing sides of a single substrate. For example, in an embodiment the metasurface 1790a depicted in FIG. 17A may instead be arranged on or proximate to the bottom surface 1754 of substrate 1750 to in-couple light rays 1714c and a component of light rays 1714b for collinear propagation via substrate 1750 through TIR.

As with the substrate described with respect to FIG. 9A, substrates 1750 and 1780 both include at least two surfaces 1752, 1754 and 1782, 1784 (respectively) that are substantially parallel to each other and that are internally reflective so as to provide TIR of propagating light rays. The substrates 1750 and 1780 can be made of any light-transmissive material or combination of materials with appropriate optical properties to facilitate light propagation through TIR. In some embodiments, substrates 1750 and 1780 are made of glass, for example, formed through an injection molding process. The glass used to form the substrates 1750 and 1780 can, in some embodiments, include silicon dioxide (SiO$_2$). Alternatively, in some embodiments, the substrates may be formed of a polymer resin.

In the example embodiment depicted in FIG. 17A, collinear light rays 1714a-c having different wavelengths (i.e., colors) originate from an entry pupil 1710 (e.g., imagers of a display module 254) and enter the first substrate 1750 via metasurface coupling element 1760a. As shown in FIG. 17A, light rays 1714a (e.g., in the blue wavelength spectrum) and a first component of light rays 1714b (e.g., in the green wavelength spectrum) are in-coupled at metasurface 1760a for collinear propagation via the first substrate 1750 through TIR. On the other hand, light rays light rays 1714c (e.g., in the red wavelength spectrum) and a second component of light rays 1714b (e.g., in the green wavelength spectrum) pass through substrate 1750 and are in-coupled at metasurface 1790a for collinear propagation via the second substrate 1780 through TIR. The light rays propagated via the first substrate 1750 are then out-coupled at metasurface 1762a and directed collinearly towards the exit pupil 1712. Similarly, the light rays propagated via the second substrate 1780 are out-coupled at metasurface 1792a and directed collinearly towards the exit pupil 1712.

In a second embodiment depicted in FIG. 17B, an optical waveguide 1700b is presented that is a variation on the waveguide 1700a depicted in FIG. 17A. Like waveguide 1700a, waveguide 1700b includes a first substrate 1750 with metasurface optical coupling elements 1760b and 1762b. The optical waveguide 1700b further includes a second substrate 1780 that also includes metasurface optical coupling elements 1790b and 1792b. Similar to waveguide 1700a, the waveguide 1700b depicted in FIG. 17B utilizes metasurfaces as optical coupling elements and splits propagation of certain wavelengths of incident light among the two substrates 1750 and 1780. However, instead of splitting components of a particular wavelength of light (e.g. green) between the two substrates, the waveguide 1700*b* depicted in FIG. 17B is configured to propagate certain colors (e.g., green and blue) via a first substrate 1750 and other colors (e.g., red) via a second substrate 1780.

Specifically, the example waveguide 1700*b* propagates light falling within a first and second wavelength (e.g., blue and green light) via the first substrate 1750 and propagates light falling within a third wavelength (e.g., red light) via the second substrate 1780. In the example embodiment this can be referred to a BG-R system in that one substrate propagates blue and green light and a second substrate propagates red light. By splitting the coupling of multiple wavelengths of light among two substrates, the metasurfaces used as coupling elements can be configured to more effectively in-couple and out-couple particular components of light (e.g., particular wavelengths and particular angles of incidence) while still reducing overall system complexity and weight as compared to a three plate design.

The example of a BG-R system is described with respect to FIG. 17B for illustrative purposes, however it is not to be construed as limiting. In other embodiments, different combinations of components of light may be propagated via the multiple substrates. Further, in some embodiments more than two substrates may be utilized, for example, similar to the waveguide 800 described with respect to FIG. 8. In other embodiments multiple in-coupling and out-coupling elements may be arranged on opposing sides of a single substrate. For example, in an embodiment the metasurface 1790*b* depicted in FIG. 17B may instead be arranged on or proximate to the bottom surface 1754 of substrate 1750 to in-couple light rays 1714*c* for collinear propagation via substrate 1750 through TIR. In some embodiments, elements configured to couple monochromatic light may be implemented as standard DOEs such as an SRG or an SBG instead as metasurfaces. For example, coupling elements 1790*b* and 1792*b* of waveguide 1700*b* depicted in FIG. 17B may in some embodiments include a DOE configured to couple a particular wavelength of light (e.g. red) through diffraction.

As previously alluded to, certain embodiments may combine the benefits of metamaterial-based optical elements with the deflection characteristics of DOEs such as SRGs or SBGs. FIGS. 18A-18D show several example embodiments of pupil relay systems that employ such a hybrid approach. In a first embodiment, depicted in FIG. 18A, an optical waveguide 1800*a* includes a substrate 1850*a* and an in-coupling element that includes a metasurface 1860*a* and a DOE 1864*a*. Note that the optical waveguide 1800*a* may also include a corresponding out-coupling element, however this is omitted from FIG. 18A for clarity.

As with the substrate described with respect to FIG. 9A, substrate 1850*a* includes at least two surfaces 1852*a* and 1854*a* that are substantially parallel to each other and that are internally reflective so as to provide TIR of propagating light rays. Substrate 1850*a* can be made of any light-transmissive material or combination of materials with appropriate optical properties to facilitate light propagation through TIR. In some embodiments, substrate 1850*a* is made of glass, for example, formed through an injection molding process. The glass used to form the substrate 1850*a* can, in some embodiments, include silicon dioxide ($SiO_2$). Alternatively, in some embodiments, the substrate may be formed of a polymer resin.

Figure 18A:
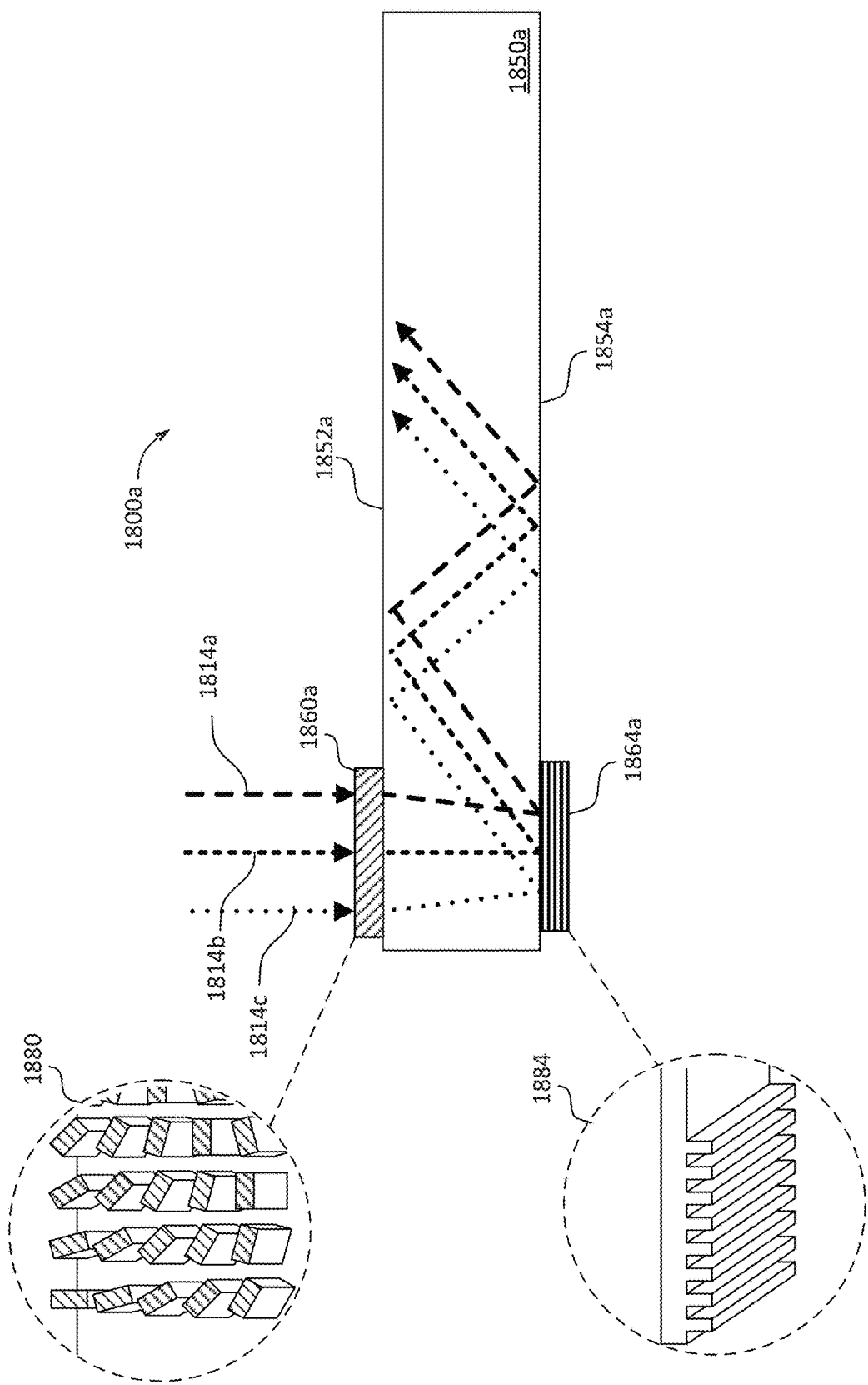
FIG. 18A shows a first example waveguide including a hybrid optical coupling element including a metasurface on one surface of a substrate and a surface relief grating on a second surface of the substrate.

In the example embodiment depicted in FIG. 18A, collinear light rays 1814*a-c* having different wavelengths (i.e., colors) enter substrate 1850*a* via the in-coupling element. The in-coupling element is configured so as to deflect a plurality of wavelengths of an incident light ray collinearly for propagation via the light transmissive substrate 1850*a* through total internal reflection. Specifically, as shown in FIG. 18A, the optical coupling element (in this case an in-coupling element) is separated into two discreet components: a metasurface 1860*a* and a DOE 1864*a*, for example in the form of an SRG or an SBG. This is illustrated in FIG. 18A by details 1880 and 1884 corresponding to elements 1860*a* and 1864*a* (respectively). Again, the structures depicted in details 1880 and 1884 are exemplary and are provided for illustrative purposes. Further, the example structures depicted in details 1880 and 1884 are shown with exaggerated features for illustrative purposes. The details are not intended to impart limitation with respect to the number, shape, arrangement, orientation, or dimensions of the features of the corresponding optical element. In other embodiments elements 1860*a* and 1864*a* may have different structure patterns.

In the examples depicted in FIGS. 18A-18D, light rays 1814*a-c* may represent component colors of light generated by one or more imagers of a display module 254 of an NED device 140. In some embodiments, polychromatic images are generated by projecting light in a plurality of component colors according to a color model. For example, the RGB color model is commonly employed in various imaging applications to reproduce a wide range of colors. Using the RGB color model, an imager may generate three different colors of light rays, specifically light falling within a red spectrum, a green spectrum, and a blue spectrum. Note, that the light generated within any particular spectrum may itself include light at a plurality of wavelengths.

Similar to the in-coupling element (e.g., collectively represented by elements 1860*a* and 1864*a*), an out-coupling element (not shown) may be configured so as to deflect a plurality of wavelengths of an incident light ray propagated through the substrate 1850*a-d* out of the substrate collinearly towards an exit pupil (not shown). For example, the exit pupil may represent an eye of a user of an NED device.

Note that the light rays 1814*a-c* shown in FIGS. 18A-18D only represent a particular angle of incidence. In practice, light rays at varying angles of incidence would enter the substrate 1850*a-d* via the in-coupling element and exit the substrate 1850*a-d* at an out-coupling element, resulting a particular FOV of a translated image. As such, to maximize the effective FOV of a resulting image displayed via the waveguides 1800*a-d*, the in-coupling element and out-coupling element can be designed with a goal of deflecting a maximum range of incoming light at an angle suitable for propagation through TIR via the substrate 1850*a-d*.

The example waveguide 1800*a* depicted in FIG. 18A, includes a metasurface 1860*a* formed on or proximate to a first surface 1852*a* of the substrate 1850*a*, and a DOE 1864*a* formed on or proximate to a second surface 1854*a* of the substrate 1850*a* that is opposite the first surface 1852*a*. As shown in FIG. 18A, incoming light rays 1814*a-c* are deflected by the metasurface element 1860*a* towards the DOE 1864 which then further deflects the rays (through diffraction) collinearly for propagation through the substrate 1850*a* by TIR. Note the relatively minor deflection angle by the metasurface 1860*a* and the comparatively greater angle of deflection by the DOE 1864*a*. In this example embodiment, the metasurface 1860*a* may be considered a "color correcting" element in that it deflects certain wavelengths of incident light at particular angles so that when the resulting light rays are deflected by the DOE 1864*a*, they exit at the same angle. Recall that without the color correcting effect by the metasurface 1860, a DOE such as an SRG will tend to deflect incident light rays of varying wavelengths at different angles, thereby resulting in dispersion. In this sense, the two elements 1860*a* and 1864*a* depicted in the example waveguide 1800*a* have separate but overlapping roles. The DOE 1864*a* effectively serves as the coupling element as it handles the greater angles of deflection to direct light rays for TIR. Conversely, the metasurface 1860*a* servers as a color correcting element that when used in conjunction with the DOE 1864*a* counters the effects of dispersion caused by the DOE 1864*a*. However, as used herein, the combination of element 1860*a* and 1864*a* is collectively referred to as the coupling element.

Figure 18B:
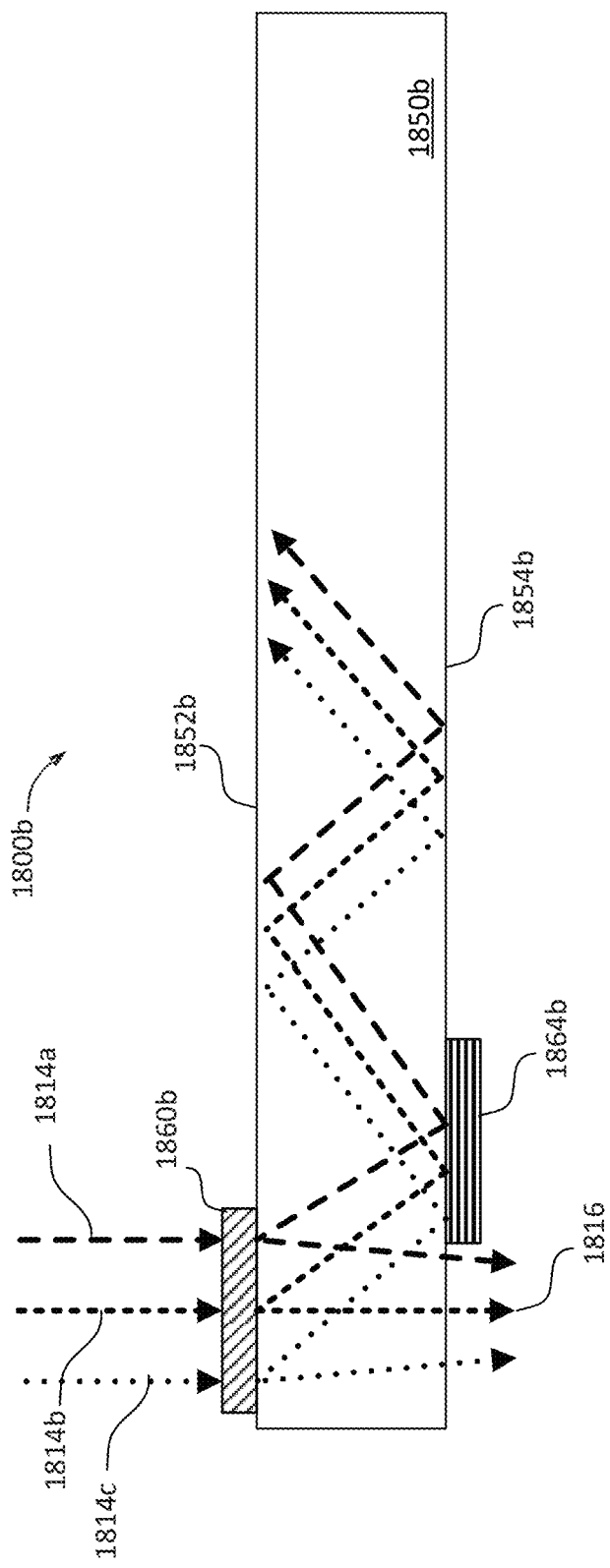
FIG. 18B shows a second example waveguide including a hybrid optical coupling element including a metasurface on one surface of a substrate and a surface relief grating on a second surface of the substrate.

FIG. 18B shows another example embodiment of a pupil relay system that includes a hybrid coupling element. Similar to waveguide 1800*a* depicted in FIG. 18A, example waveguide 1800*b* includes a substrate 1850*b* that includes at least two surfaces 1852*b* and 1854*b* that are substantially parallel to each other and that are internally reflective so as to provide TIR of propagating light rays. Substrate 1850*b* can be made of any light-transmissive material or combination of materials with appropriate optical properties to facilitate light propagation through TIR. In some embodiments, substrate 1850*b* is made of glass, for example, formed through an injection molding process. The glass used to form the substrate 1850*b* can, in some embodiments, include silicon dioxide ($SiO_2$). Alternatively, in some embodiments, the substrate may be formed of a polymer resin.

The example waveguide 1800*b* also includes an optical coupling element that includes a metasurface element 1860*b* formed on or proximate to a first surface 1852*b* of the substrate 1850*b*, and a DOE (e.g., and SRG and/or SBG) 1864*b* formed on or proximate to a second surface 1854*b* of the substrate 1850*b* that is opposite the first surface 1852*b*.

The example waveguide 1800*b* depicted in FIG. 18B differs from the example waveguide 1800*a* depicted in FIG. 18A in that the two optical elements 1860*b* and 1864*b* are not aligned. As shown in FIG. 18B, in such a configuration, zero order light 1816 from incident rays 1814*a-c* may be wasted. However, an offset configuration similar to as shown in FIG. 18B has the benefit of requiring less strict tolerances in the calibration and alignment of elements 1860*b* and 1864*b* for proper propagation of deflected light rays for TIR. This can have particular manufacturing benefits for waveguides used in displays for mass-produced consumer products.

Figure 18C:
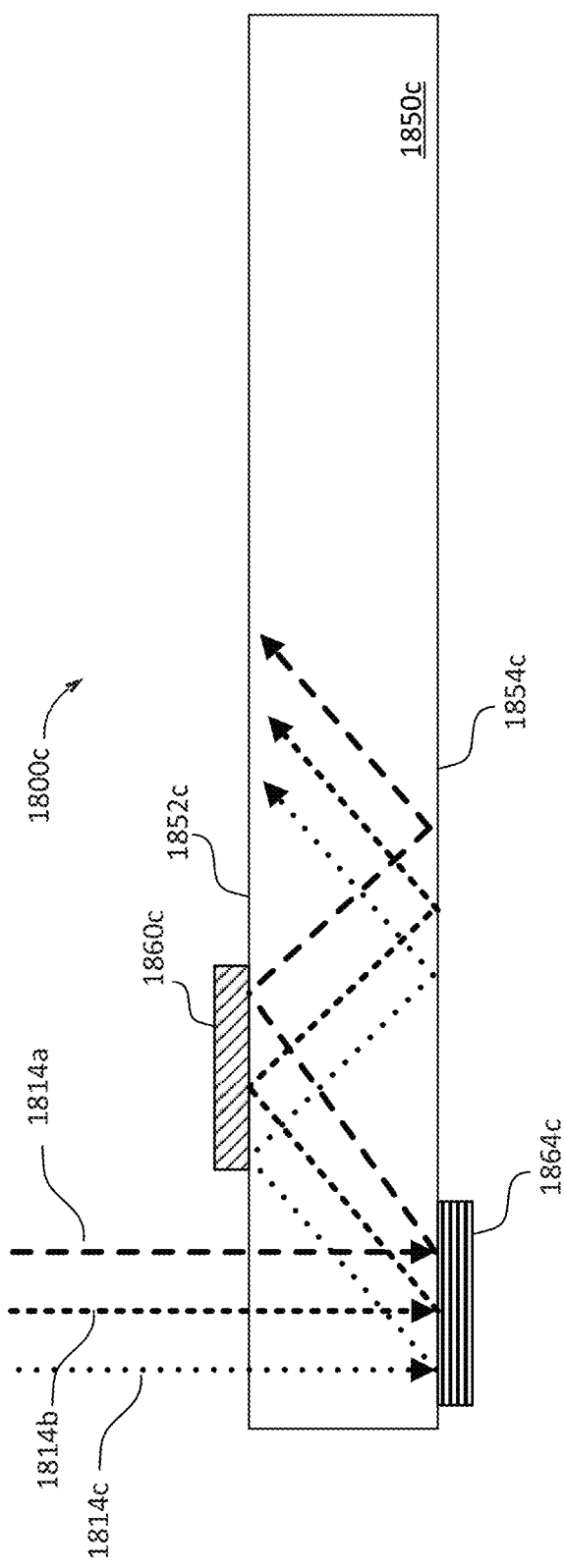
FIG. 18C shows a third example waveguide including a hybrid optical coupling element including a metasurface on one surface of a substrate and a surface relief grating on a second surface of the substrate.

FIG. 18C shows yet another example embodiment of a pupil relay system that includes a hybrid coupling element. Similar to waveguide 1800*a* depicted in FIG. 18A, example waveguide 1800*c* includes a substrate 1850*c* that includes at least two surfaces 1852*c* and 1854*c* that are substantially parallel to each other and that are internally reflective so as to provide TIR of propagating light rays. Substrate 1850*c* can be made of any light-transmissive material or combination of materials with appropriate optical properties to facilitate light propagation through TIR. In some embodiments, substrate 1850*c* is made of glass, for example, formed through an injection molding process. The glass used to form the substrate 1850*c* can, in some embodiments, include silicon dioxide ($SiO_2$). Alternatively, in some embodiments, the substrate may be formed of a polymer resin.

The example waveguide 1800*c* also includes an optical coupling element that includes a metasurface element 1860*c* formed on or proximate to a first surface 1852*c* of the substrate 1850*c*, and a DOE (e.g., an SRG and/or SBG) 1864*c* formed on or proximate to a second surface 1854*c* of the substrate 1850*c* that is opposite the first surface 1852*c*.

The example waveguide 1800*c* depicted in FIG. 18C is similar to the example waveguide 1800*b* depicted in FIG. 18B in that the two optical elements 1860*c* and 1864*c* are offset. However, in the example waveguide 1800*c* depicted in FIG. 18C, the light rays 1814*a-c* are first deflected by the DOE 1864*c* as they enter the substrate 1850*c*. As shown in FIG. 18C, diffraction by the DOE 1864*c* may cause the varying wavelengths of light to deflect at different angles (i.e., disperse). As further shown, this dispersion caused by the DOE 1864*c* is then "corrected" by the metasurface 1860*c* to allow for collinear propagation through the substrate 1850*c* by TIR.

Figure 18D:
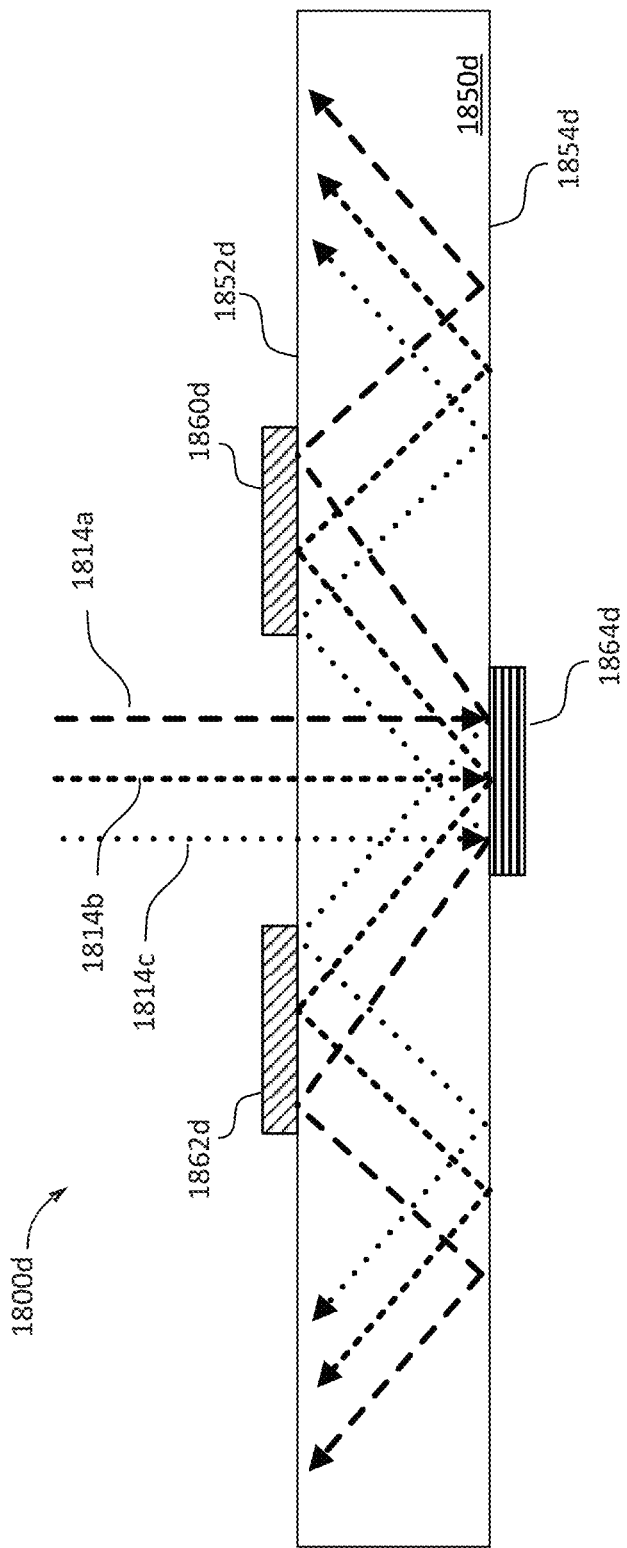
FIG. 18D shows a fourth example waveguide including a hybrid optical coupling element including a metasurface on one surface of a substrate and a surface relief grating on a second surface of the substrate.

FIG. 18D shows yet another example embodiment of a pupil relay system that includes a hybrid coupling element. Specifically, the example embodiment shown in FIG. 18D depicts a split-pupil relay system similar to, for example, as described with respect to FIGS. 3C-3D.

Similar to waveguide 1800*a* depicted in FIG. 18A, example waveguide 1800*d* includes a substrate 1850*d* that includes at least two surfaces 1852*d* and 1854*d* that are substantially parallel to each other and that are internally reflective so as to provide TIR of propagating light rays. Substrate 1850*d* can be made of any light-transmissive material or combination of materials with appropriate optical properties to facilitate light propagation through TIR. In some embodiments, substrate 1850*d* is made of glass, for example, formed through an injection molding process. The glass used to form the substrate 1850*d* can, in some embodiments, include silicon dioxide ($SiO_2$). Alternatively, in some embodiments, the substrate may be formed of a polymer resin.

The example waveguide 1800*d* also includes an optical coupling element that includes metasurface-based elements 1860*d* and 1862*d* formed on or proximate to a first surface 1852*d* of the substrate 1850*d*, and a DOE (e.g., and SRG or SBG) 1864*d* formed on or proximate to a second surface 1854*d* of the substrate 1850*d* that is opposite the first surface 1852*d*.

As shown in FIG. 18D, the incident light rays 1814*a-c* are first deflected by the DOE 1864*d* as they enter the substrate 1850*d*. However, the incident light rays are deflected in two directions; towards a first metasurface 1860*d* and towards a second metasurface 1862*d*. As shown in FIG. 18D, diffraction by the DOE 1864*d* may cause the varying wavelengths of light to deflect at different angles (i.e., disperse). As further shown, this dispersion caused by the DOE 1864*d* is then "corrected" by the metasurfaces 1860*d* and 1862*d* to allow for collinear propagation in both directions through the substrate 1850*d* by TIR.

Although not shown in FIG. 18D, waveguide 1800*d* may also include two corresponding optical out-coupling elements configured to out-couple the propagated light rays in both directions and direct the light rays towards the eye of a user of an NED device. In some embodiments, these out-coupling elements may be hybrid coupling elements (i.e., an SRG and a metasurface), for example, similar to those shown with respect to FIGS. 18A-18C.

The embodiments described with respect to FIGS. 18A-18D are examples provided for illustrative purposes and are not intended to be limiting. Further, the component elements (i.e., the metasurface and DOE) forming the hybrid coupling elements in FIGS. 18A-18D are shown in conceptual form and are not intended to impart limitations with respect to the dimensions or relative placement of any of the elements. For example, although not depicted in FIGS. 18A-18D, in some cases, the component elements (i.e., the metasurface and DOE) forming the hybrid coupling elements can be layered one of the other on one of the surfaces of the substrate instead of placed on opposing surfaces. Although such a configuration may be effective, it likely would require variation in the grating structure of the DOE over an area of the DOE which would increase difficulty and cost of manufacture.

EXAMPLES OF CERTAIN EMBODIMENTS

Certain embodiments of the technology introduced herein are summarized in the following numbered examples:

1. An optical waveguide comprising: a light-transmissive substrate including a plurality of internally reflective surfaces; and an optical coupling element configured to input light rays to the light-transmissive substrate or output light rays from the light-transmissive substrate, the optical coupling element configured to deflect a plurality of wavelengths of an incident light ray collinearly for propagation within the light-transmissive substrate through total internal reflection (TIR).

2. The optical waveguide of example 1, wherein the optical coupling element is achromatic.

3. The optical waveguide of example 1 or example 2, wherein the optical coupling element includes a pattern of structures arranged on or proximate to at least a first surface of the plurality of internally reflective surfaces of the light-transmissive substrate.

4. The optical waveguide of any of examples 1 to 3, wherein the pattern of structures collectively form a metasurface.

5. The optical waveguide of any of examples 1 to 4, wherein the pattern of structures is arranged to deflect the plurality of wavelengths of the incident light ray by causing a phase shift in the incident light ray.

6. The optical waveguide of any of examples 1 to 5, wherein the spacing between structures in the pattern of structures is smaller than each of the plurality of wavelengths of the incident light ray.

7. The optical waveguide of any of examples 1 to 6, wherein the pattern of structures is aperiodic.

8. The optical waveguide of any of examples 1 to 7, wherein the structures forming the pattern of structures comprise dielectric resonators.

9. The optical waveguide of any of examples 1 to 8, wherein the structures forming the pattern of structures are made of titanium dioxide.

10. The optical waveguide of any of examples 1 to 9, wherein the plurality of wavelengths of the incident light ray include light in a red spectrum, a green spectrum, and a blue spectrum.

11. The optical waveguide of any of examples 1 to 10, arranged as part of a pupil relay system in a near eye display (NED) display device, the pupil relay system arranged to translate light rays from an image generator of the NED device to an eye of a user of the NED device.

12. The optical waveguide of any of examples 1 to 11, wherein the optical coupling element is an in-coupling element arranged to input light rays received from the image generator of the NED device into the light-transmissive substrate.

13. The optical waveguide of any of examples 1 to 12, wherein the optical coupling element is an out-coupling element arranged to output light rays from the light-transmissive substrate and to direct the light rays along an optical path for transmission into an eye of the user of the NED device.

14. The optical waveguide of any of examples 1 to 13, further comprising a second light-transmissive substrate including a plurality of internally reflective surfaces and a second optical coupling element configured to input light rays to the second light-transmissive substrate or output light rays from the second light-transmissive substrate, the second optical coupling element configured to deflect a particular wavelength of the incident light ray collinearly for propagation within the second light-transmissive substrate through total internal reflection (TIR), the particular wavelength different than said plurality of wavelengths.

15. The optical waveguide of any of examples 1 to 14, wherein the plurality of wavelengths of the incident light ray include light in a green spectrum and a blue spectrum and wherein the particular wavelength of the incident light ray includes light in a red spectrum.

16. The optical waveguide of any of examples 1 to 15, wherein the optical coupling element further includes a second pattern of structures arranged on or proximate to at least a second surface of the plurality of internally reflective surfaces of the light-transmissive substrate, the second surface opposite the first surface of the light-transmissive substrate, and wherein the second pattern of structures arranged on or proximate to the second surface of the light-transmissive substrate is configured to deflect a different wavelength of the incident light ray than the pattern of structures on or proximate to the first surface of the light-transmissive substrate 17. The optical waveguide of any of examples 1 to 16, wherein the light-transmissive substrate is made of glass.

18. A near-eye display (NED) device comprising a light-emitting microdisplay imager configured to emit light rays that collectively form a generated image, and an optical waveguide including: a light-transmissive substrate including a plurality of internally reflective surfaces, an optical in-coupling element configured to input light rays received from the microdisplay imager into the light-transmissive substrate, the optical in-coupling element configured to deflect a plurality of wavelengths of an incident light ray collinearly for propagation within the light-transmissive substrate through total internal reflection (TIR), and an optical out-coupling element configured to output light rays from the light-transmissive substrate to an eye of a user of the NED device, the optical out-coupling element configured to deflect the plurality of wavelengths of the propagated light collinearly towards the eye of the user.

19. A method of manufacturing a waveguide display, the method comprising: forming a layer of resist material on a first surface of a light-transmissive substrate that has a plurality of internally reflective surfaces, applying a beam of electrons to the layer of resist material to form a pattern in the resist material, filling at least a portion of the pattern with a dielectric material, removing remaining resist material to produce a pattern of dielectric structures on the first surface of a light-transmissive substrate, wherein the pattern of dielectric structures is such that, when in use, a plurality of wavelengths of an incident light ray are deflected collinearly for propagation within the light-transmissive substrate through total internal reflection (TIR).

20. The method of example 19, wherein the pattern of dielectric structures collectively form a metasurface.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An optical waveguide comprising:
 a light-transmissive substrate including a plurality of internally reflective surfaces; and
 an achromatic optical coupling element comprising a metasurface configured to input light rays to the light-transmissive substrate or output light rays from the light-transmissive substrate without separating the light rays into constituent colors, the achromatic optical coupling element configured to deflect a plurality of wavelengths of an incident light ray collinearly for propagation within the light-transmissive substrate through total internal reflection (TIR), wherein the metasurface of the achromatic optical coupling element includes a pattern of sub-wavelength nano-structures arranged on or proximate to at least a first surface of the plurality of internally reflective surfaces of the light-transmissive substrate.

2. The optical waveguide of claim 1, wherein the pattern of sub-wavelength nano-structures is arranged to deflect the plurality of wavelengths of the incident light ray by causing a phase shift in the incident light ray.

3. The optical waveguide of claim 1, wherein a spacing between structures in the pattern of sub-wavelength nano-structures is smaller than each of the plurality of wavelengths of the incident light ray.

4. The optical waveguide of claim 1, wherein the pattern of sub-wavelength nano-structures is aperiodic.

5. The optical waveguide of claim 1, wherein the structures forming the pattern of sub-wavelength nano-structures comprise dielectric resonators.

6. The optical waveguide of claim 1, wherein the structures forming the pattern of sub-wavelength nano-structures include titanium dioxide.

7. The optical waveguide of claim 1, wherein the plurality of wavelengths of the incident light ray include light in a:
 red spectrum;
 green spectrum; and
 blue spectrum.

8. The optical waveguide of claim 1, arranged as part of a pupil relay system in a near eye display (NED) device, the pupil relay system arranged to translate light rays from an image generator of the NED device to an eye of a user of the NED device.

9. The optical waveguide of claim 8, wherein the achromatic optical coupling element is an in-coupling element arranged to input light rays received from the image generator of the NED device into the light-transmissive substrate.

10. The optical waveguide of claim 8, wherein the achromatic optical coupling element is an out-coupling element arranged to output light rays from the light-transmissive substrate and to direct the light rays along an optical path for transmission to the eye of the user of the NED device.

11. The optical waveguide of claim 1, further comprising:
 a second light-transmissive substrate including another plurality of internally reflective surfaces; and
 a second optical coupling element comprising a metasurface configured to input light rays to the second light-transmissive substrate or output light rays from the second light-transmissive substrate, the second optical coupling element configured to deflect a particular wavelength of the incident light ray collinearly for propagation within the second light-transmissive substrate through TIR, the particular wavelength different than said plurality of wavelengths.

12. The optical waveguide of claim 11, wherein the plurality of wavelengths of the incident light ray include light in a green spectrum and a blue spectrum; and
 wherein the particular wavelength of the incident light ray includes light in a red spectrum.

13. The optical waveguide of claim 1, wherein the achromatic optical coupling element further includes:
 a second pattern of sub-wavelength nano-structures arranged on or proximate to at least a second surface of the plurality of internally reflective surfaces of the light-transmissive substrate, the second surface opposite the first surface of the light-transmissive substrate;
 wherein the second pattern of sub-wavelength nano-structures arranged on or proximate to the second surface of the light-transmissive substrate is configured to deflect a different wavelength of the incident light ray than the pattern of sub-wavelength nano-structures on or proximate to the first surface of the light-transmissive substrate.

14. The optical waveguide of claim 1, wherein the light-transmissive substrate includes glass.

15. A near-eye display (NED) device comprising:
 a light-emitting microdisplay imager configured to emit light rays that collectively form a generated image; and
 an optical waveguide including:
  a light-transmissive substrate including a plurality of internally reflective surfaces;
  an optical in-coupling element configured to input light rays received from the light-emitting microdisplay imager into the light-transmissive substrate, the optical in-coupling element configured to deflect a plurality of wavelengths of an incident light ray collinearly for propagation within the light-transmissive substrate through total internal reflection (TIR), wherein the optical in-coupling element includes a first pattern of structures arranged on or proximate to at least a first surface location of the plurality of internally reflective surfaces of the light-transmissive substrate; and
  an optical out-coupling element configured to output light rays from the light-transmissive substrate to an eye of a user of the NED device, the optical out-coupling element configured to deflect the plurality of wavelengths collinearly towards the eye of the user, wherein the optical out-coupling element includes a second pattern of structures arranged on or proximate to at least a second surface location of the plurality of internally reflective surfaces of the light-transmissive substrate.

16. A method of manufacturing a waveguide display, comprising:
- forming a layer of a resist material on a first surface of a light-transmissive substrate that has a plurality of internally reflective surfaces;
- applying a beam of electrons to the layer of the resist material to form a pattern in the resist material;
- filling at least a portion of the pattern with a dielectric material; and
- removing remaining resist material to produce a pattern of sub-wavelength dielectric nano-structures on the first surface of the light-transmissive substrate providing an achromatic optical coupling element comprising a metasurface configured to input light rays to the light-transmissive substrate or output light rays from the light-transmissive substrate without separating the light rays into constituent colors, the achromatic optical coupling element, wherein the pattern of dielectric structures is such that, when in use, a plurality of wavelengths of an incident light ray are deflected collinearly for propagation within the light-transmissive substrate through total internal reflection (TIR).

17. The method of claim 16, wherein the dielectric material comprises titanium dioxide.

18. The method of claim 16, wherein producing the pattern of sub-wavelength dielectric nano-structures comprises producing an aperiodic pattern.

* * * * *